(12) United States Patent
Dahouk et al.

(10) Patent No.: US 10,087,938 B2
(45) Date of Patent: Oct. 2, 2018

(54) PUMP, ASSOCIATED ELECTRIC MACHINE AND ASSOCIATED METHOD

(71) Applicant: Regal Beloit America, Inc., Beloit, WI (US)

(72) Inventors: Mohamad Khalil Dahouk, Fort Wayne, IN (US); Jason Jon Kreidler, Sheboygan Falls, WI (US); Bruce R. Cole, Fort Wayne, IN (US); Norman Carl Golm, Jr., Fort Wayne, IN (US); Lester Benjamin Manz, Paulding, OH (US); Gregory L. Gross, Fort Wayne, IN (US); Michael Allen Marks, Fort Wayne, IN (US); John Sheldon Wagley, Winona Lake, IN (US); Yilcan Guzelgunler, Troy, OH (US)

(73) Assignee: Regal Beloit America, Inc., Beloit, WI (US)

( * ) Notice: Subject to any disclaimer, the term of this patent is extended or adjusted under 35 U.S.C. 154(b) by 331 days.

(21) Appl. No.: 14/514,984

(22) Filed: Oct. 15, 2014

(65) Prior Publication Data
US 2015/0110642 A1    Apr. 23, 2015

Related U.S. Application Data

(60) Provisional application No. 61/892,604, filed on Oct. 18, 2013.

(51) Int. Cl.
*F04D 15/00* (2006.01)
*F04D 13/06* (2006.01)
(Continued)

(52) U.S. Cl.
CPC .......... *F04D 15/0066* (2013.01); *F04D 7/04* (2013.01); *F04D 13/068* (2013.01);
(Continued)

(58) Field of Classification Search
CPC ...... F04D 15/0066; F04D 7/04; F04D 13/068; F04D 13/086; F04D 13/12;
(Continued)

(56) References Cited

U.S. PATENT DOCUMENTS 1,978,986 A * 10/1934 Coberly ................. H02K 16/00
310/87
2,030,986 A    2/1936 Havill
(Continued)

FOREIGN PATENT DOCUMENTS

CN    1652328 A    8/2005
EP    1101435 B1   4/2009
(Continued)

*Primary Examiner* — Kenneth J Hansen
*Assistant Examiner* — Benjamin Doyle
(74) *Attorney, Agent, or Firm* — John Wagley

(57) ABSTRACT

A pumping device for pumping a fluid is provided. The pumping device includes a pump and a power housing. At least a portion of the pump is positioned within the power housing. The pumping device also includes a first motor and a second motor. The first motor is operably connected to the pump and adapted to provide energy to the pump. At least a portion of the first motor is positioned within the power housing. The second motor is operably connected to the pump and adapted to provide energy to the pump. At least a portion of the second motor is positioned within the power housing.

19 Claims, 12 Drawing Sheets

(51) Int. Cl.
*F04D 29/58* (2006.01)
*H02K 16/00* (2006.01)
*F04D 7/04* (2006.01)
*F04D 13/08* (2006.01)
*F04D 13/12* (2006.01)
*H02K 5/22* (2006.01)
*H02K 7/14* (2006.01)
*F04D 29/70* (2006.01)

(52) U.S. Cl.
CPC ........... *F04D 13/086* (2013.01); *F04D 13/12* (2013.01); *F04D 29/5806* (2013.01); *H02K 5/225* (2013.01); *H02K 7/14* (2013.01); *H02K 16/00* (2013.01); *F04D 29/708* (2013.01)

(58) Field of Classification Search
CPC .... F04D 29/5806; F04D 29/708; F04D 13/00; H02K 5/225; H02K 7/14; H02K 16/00
USPC .......... 417/411; 310/22, 49.06, 12.13, 12.15, 310/112, 14
See application file for complete search history.

(56) References Cited

U.S. PATENT DOCUMENTS

| | | | | |
|---|---|---|---|---|
| 2,055,481 A * | 9/1936 | Coberly | ................. | H02K 5/132 310/112 |
| 2,246,276 A | 6/1941 | Davidson | | |
| 2,860,266 A * | 11/1958 | Schrader | ............. | F16H 25/2018 251/129.11 |
| 2,970,249 A * | 1/1961 | Mazur | ................... | H02K 17/38 310/112 |
| 3,426,224 A * | 2/1969 | Esters | ................... | H02K 23/04 310/154.43 |
| 3,726,606 A * | 4/1973 | Peters | ................. | F04D 15/0072 417/40 |
| 3,868,198 A * | 2/1975 | Purtell | ................... | F04D 9/007 417/279 |
| 4,031,421 A * | 6/1977 | Geiger | ................... | H02K 19/34 310/112 |
| 4,087,204 A * | 5/1978 | Niedermeyer | ........ | F04B 49/025 417/17 |
| 4,164,852 A * | 8/1979 | Anzalone | ................ | F24F 13/00 310/112 |
| 4,177,021 A | 12/1979 | Niedermeyer | | |
| 4,201,519 A | 5/1980 | Niedermeyer | | |
| 4,222,711 A * | 9/1980 | Mayer | ................... | F04B 49/06 417/36 |
| 4,631,001 A * | 12/1986 | Keech | ................... | G05D 9/12 137/515.5 |
| 4,703,956 A * | 11/1987 | Keech | ................... | E03F 5/22 285/133.3 |
| 4,730,989 A | 3/1988 | Laing | | |
| 5,234,319 A * | 8/1993 | Wilder | ................. | F04B 49/025 417/40 |
| 5,596,236 A * | 1/1997 | Lee | ................... | A47L 9/2842 200/1 A |
| 5,692,882 A * | 12/1997 | Bozeman, Jr. | .......... | A61M 1/10 310/216.013 |
| 5,778,671 A * | 7/1998 | Bloomquist | ........ | F15B 21/087 417/371 |
| 6,454,010 B1 * | 9/2002 | Thomas | ................. | E21B 17/18 166/105 |
| 6,457,306 B1 * | 10/2002 | Abel | ................. | B64G 1/401 417/16 |
| 6,648,252 B2 * | 11/2003 | Strutz | ................... | E03C 1/2665 241/101.2 |
| 6,682,312 B1 * | 1/2004 | Ward | ................... | F04B 1/324 417/199.1 |
| 6,736,605 B2 * | 5/2004 | Ohashi | ................. | F04B 1/22 417/222.1 |
| 7,034,422 B2 * | 4/2006 | Ramu | ................... | H02K 1/246 310/112 |
| 7,309,216 B1 * | 12/2007 | Spadola, Jr. | ............. | F04B 49/02 417/18 |
| 8,186,975 B2 * | 5/2012 | Kochan, Jr. | ......... | F04D 13/0666 310/268 |
| 8,435,009 B2 * | 5/2013 | Moore | ................. | F04D 15/0077 417/6 |
| 8,561,502 B2 | 10/2013 | Schultz | | |
| 8,689,759 B2 | 4/2014 | Schultz | | |
| 8,791,664 B2 * | 7/2014 | Krishnamoorthy | ....... | H02P 6/06 318/727 |
| 8,956,130 B2 * | 2/2015 | Buzit | ..................... | F04D 9/008 417/423.3 |
| 9,404,500 B2 * | 8/2016 | Stiles, Jr. | ............. | F04D 15/0066 |
| 9,638,193 B2 * | 5/2017 | Bishop | .................... | F04D 15/00 |
| 2001/0032587 A1 * | 10/2001 | Falck | .................... | B05B 12/085 118/679 |
| 2002/0079763 A1 * | 6/2002 | Fleshman | .............. | H02K 5/132 310/87 |
| 2003/0049134 A1 * | 3/2003 | Leighton | .............. | F04D 29/2222 417/40 |
| 2003/0116323 A1 * | 6/2003 | Pettigrew | .............. | E21B 43/128 166/369 |
| 2004/0018104 A1 * | 1/2004 | Watkins | ................ | A01K 63/047 417/423.3 |
| 2004/0194387 A1 * | 10/2004 | Hom | ..................... | E01F 13/048 49/49 |
| 2005/0103286 A1 * | 5/2005 | Ji | ................ | F01P 5/10 123/41.44 |
| 2006/0099090 A1 | 5/2006 | Kramp et al. | | |
| 2006/0175064 A1 * | 8/2006 | Yuratich | ................ | E21B 43/128 166/381 |
| 2006/0222529 A1 * | 10/2006 | Watson | ................. | F04D 13/021 417/414 |
| 2007/0134111 A1 * | 6/2007 | Eybergen | .............. | F04D 13/028 417/423.6 |
| 2007/0273225 A1 * | 11/2007 | Head | ....................... | F04D 13/10 310/87 |
| 2008/0056911 A1 * | 3/2008 | Hanke | .................. | A01K 63/047 417/22 |
| 2008/0111434 A1 * | 5/2008 | Head | .................. | E21B 43/128 310/87 |
| 2008/0286134 A1 * | 11/2008 | Regalado | .............. | F04D 13/10 417/423.3 |
| 2009/0142207 A1 * | 6/2009 | Ring | .................... | F04B 47/06 417/410.1 |
| 2010/0155036 A1 * | 6/2010 | Andris | .................... | F01P 7/164 165/104.31 |
| 2010/0231155 A1 * | 9/2010 | Schmidt | .................... | G01K 1/16 318/473 |
| 2011/0150676 A1 * | 6/2011 | Buzit | .................... | F04D 9/008 417/410.1 |
| 2011/0273054 A1 * | 11/2011 | Johnston | .................. | C21D 6/00 310/216.004 |
| 2012/0010753 A1 * | 1/2012 | Schuster | ................ | F25B 49/02 700/276 |
| 2012/0017634 A1 * | 1/2012 | Dorman | ................ | F04C 18/16 62/498 |
| 2012/0082570 A1 | 4/2012 | Schultz | | |
| 2012/0148427 A1 * | 6/2012 | Irving | ................... | F04B 17/006 417/411 |
| 2012/0223603 A1 * | 9/2012 | Knapp | .................... | H02K 5/132 310/71 |
| 2012/0266595 A1 * | 10/2012 | Buschur | ................ | F02B 37/10 60/607 |
| 2013/0118705 A1 * | 5/2013 | Potter | .................... | E04H 4/129 165/11.1 |
| 2013/0270183 A1 * | 10/2013 | Snydmiller | ........ | B01D 17/0214 210/634 |
| 2013/0270945 A1 * | 10/2013 | Ziegler | ................ | H02K 21/24 310/90 |
| 2013/0294928 A1 * | 11/2013 | Rosinski | ................ | F04D 13/06 417/5 |
| 2014/0010675 A1 * | 1/2014 | Kent | .................... | F04B 43/009 417/53 |
| 2014/0101844 A1 * | 4/2014 | Wawrla | ................ | E03C 1/0404 4/638 |

(56) References Cited

U.S. PATENT DOCUMENTS

| | | | | |
|---|---|---|---|---|
| 2014/0145525 A1* | 5/2014 | Dooley | ............ | H02K 1/278 310/51 |
| 2014/0191606 A1* | 7/2014 | Gieras | ............ | H02K 19/22 310/112 |
| 2014/0205475 A1* | 7/2014 | Dale | ............ | F04D 13/086 417/351 |
| 2014/0238511 A1* | 8/2014 | Klicpera | ............ | E03B 7/071 137/551 |
| 2014/0265653 A1* | 9/2014 | Heins | ............ | H02K 21/24 310/51 |
| 2014/0343733 A1* | 11/2014 | Turner | ............ | F25B 49/025 700/276 |
| 2015/0037171 A1* | 2/2015 | Orrego | ............ | F04D 13/021 417/45 |
| 2015/0110642 A1* | 4/2015 | Dahouk | ............ | F04D 13/068 417/16 |
| 2015/0252808 A1* | 9/2015 | Rosinski | ............ | F04D 13/06 417/423.5 |
| 2015/0303418 A1* | 10/2015 | Tanaka | ............ | H01M 2/1077 429/71 |
| 2016/0006481 A1* | 1/2016 | Rendusara | ............ | F04D 1/06 340/854.9 |
| 2016/0065113 A1* | 3/2016 | Gauthier | ............ | H02P 29/021 318/490 |

FOREIGN PATENT DOCUMENTS

| | | | | |
|---|---|---|---|---|
| JP | 03595706 B2 | 12/2004 | | |
| JP | 2010255616 A | 11/2010 | | |
| JP | 03174374 U | 3/2012 | | |
| JP | 05274524 B2 | 8/2013 | | |
| JP | 05364043 B2 | 12/2013 | | |
| WO | WO 0139353 A1 * | 5/2001 | ............ | H02K 5/1285 |
| WO | WO 2012057885 A1 * | 5/2012 | ............ | F04D 17/12 |
| WO | WO 2013026775 A1 * | 2/2013 | ............ | F04D 13/086 |

* cited by examiner

PUMP, ASSOCIATED ELECTRIC MACHINE AND ASSOCIATED METHOD

CROSS REFERENCE TO RELATED APPLICATION

This application is a non-provisional application and claims priority to U.S. Provisional Patent Application 61/892,604 filed Oct. 18, 2013 for "SUMP PUMP, ASSOCIATED ELECTRIC MACHINE AND ASSOCIATED METHOD", which is hereby incorporated by reference in its entirety.

BACKGROUND OF THE INVENTION

The embodiments described herein relate generally to a pump, and more specifically, to an apparatus and method associated with a motor and pump.

Various types of electric machines are used to rotate a variety of devices such as pumps to generate fluid (such as water or other fluid) flow for a variety of applications. Such applications include fluid movement in subterranean application in consumer, commercial and industrial environments. One common fluid flow application is for use to in residential basement and crawl space sump pump applications. The sump pump is positioned in a cylindrical pit formed in the floor of the basement. Drainage tile is typically positioned around the inner and/or, outer periphery of the foundation of the dwelling and is connected to the pit so that the accumulated subterranean water is directed into the pit.

Typically an induction motor is connected to an impeller pump to form a device, typically called a sump pump, to generate fluid flow and to urge the pit water through a conduit and out the home. Motors typically include a rotating member (usually called a rotor) and a stationary member (usually called a stator). Motors typically utilize an electrical input to generate a magnetic field or fields to cause the rotor to rotate. Typically the rotor and/or stator have electrical windings that use the electrical input to generate the magnetic fields. The other of the stator or rotor may have permanent magnets rather than electrical windings to provide magnetic fields. A pump having impeller or impellers is coupled to the motor to generate the fluid flow. The impeller or impellers often extend from a shaft.

Such sump pumps are usually the sole device for the removal of subterranean water that accumulates outside and below the floor of the basement after a rainy period and in many locations that is usually present in these locations all year long. If the sump pump fails to operate, the water in the pit overflows onto the floor of the basement and may seep through the basement floor and walls into the basement. Such flooding of the basement may result in damage to the home, particularly if the basement is finished.

The sump pumps may fail causing flooding in the basement and, if the basement is finished, great damage. The motor may fail, the power may be interrupted, the pump may fail, the water conduits may be obstructed or disconnected and the pump needs may exceed the capacity of the system in extreme weather conditions.

The present invention is directed to alleviate at least some of these problems with the prior art.

BRIEF DESCRIPTION OF THE INVENTION

According to an aspect of the present invention, a sump pumping device for pumping a fluid is provided. The pumping device includes a pump adapted for pumping the fluid and a power housing connected to the pump. The pumping device further includes a first motor operably connected to the pump and adapted to provide energy to the pump. At least a portion of the first motor is positioned within the power housing. The pumping device further includes a second motor operably connected to the pump and adapted to provide energy to the pump. At least a portion of the second motor is positioned within the power housing.

According to another aspect of the present invention, a pumping device for pumping a fluid is provided. The pumping device includes a pump adapted for pumping the fluid and a first motor operably connected to the pump and adapted to provide energy to the pump. The pumping device also includes a second motor operably connected to the pump and adapted to provide energy to the pump.

According to yet another aspect of the present invention a propulsion system for a pump for removing fluid collected from the subterranean surface adjacent a building. The system includes a housing operably connectable to the pump and a first motor operably connected to the pump and adapted to provide energy to the pump. At least a portion of the first motor is positioned within the power housing. The system also includes a second motor operably connected to the pump and adapted to provide energy to the pump. At least a portion of the second motor is positioned within the power housing According to another aspect of the present invention, a system for removing fluid from subterranean surface of a building is provided. The system includes a pump adapted for pumping the fluid and a first motor operably connected to the pump and adapted to provide energy to the pump. The system also includes a second motor operably connected to the pump and adapted to provide energy to the pump.

According to another aspect of the present invention, a pumping device for pumping a fluid is provided. The device includes a pump adapted for pumping the fluid and a motor. The motor has a stator and a rotor rotatably connected to the stator. The rotor and the stator are adapted to generate flux generally in a direction parallel to a rotational axis of the motor. The motor is operably connected to the pump and is adapted to provide rotational mechanical energy to the pump.

According to another aspect of the present invention, a pumping device for pumping a fluid is provided. The device includes a pump adapted for pumping the fluid and an electronically commutated motor operably connected to the pump and adapted to provide energy to the pump. The device also includes a controller operably connected to the motor and adapted to provide signals to the motor.

According to another aspect of the present invention, a motor for use with a pump for removing fluid collected from the subterranean surface adjacent a building is provided. The motor includes a housing configured for connection to the pump. The motor also include a stator connected to the housing and a rotor rotatably connected to the stator and operably connected to the pump. The motor is adapted to provide energy to the pump. The stator has electromagnetic coils. The motor also includes a controller operably connected to the motor and adapted to provide signals to the motor to provide electronic commutation to the electromagnetic coils.

According to another aspect of the present invention, a method for removing fluid from subterranean surface of a building is provided. The method includes the steps of providing a sump, providing a discharging conduit, providing a housing, providing a pump, providing a first motor, and providing a second motor. The method also includes the step of positioning the pump. The method also includes the step of positioning the first motor and the second motor at least partially in the housing. The method also includes the step of positioning the housing at least partially in the sump and the step of connecting the pump to the discharging conduit. The method also includes the step of operably connecting the pump to the first motor and the step of operably connecting the pump to the second motor.

DETAILED DESCRIPTION OF THE INVENTION

Figure 1:
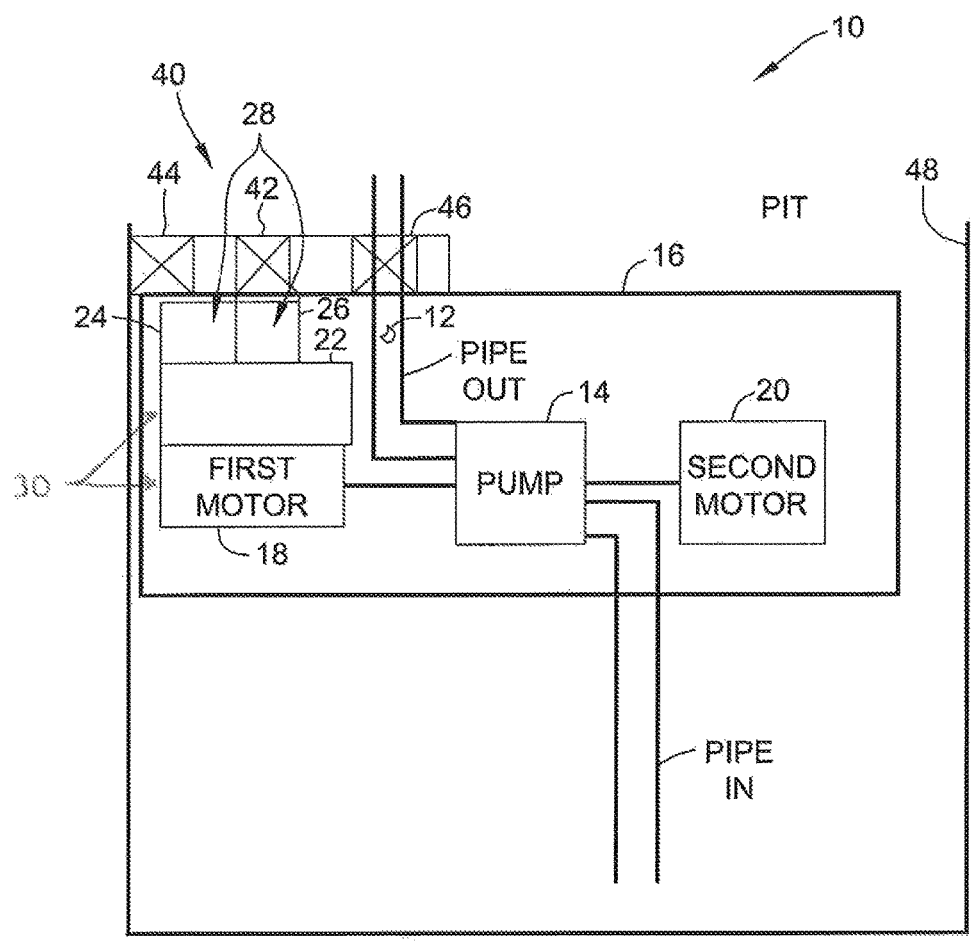
FIG. 1 is a plan view of an embodiment of the present invention in the form of a pumping device including a pump and two motors in a common housing.

Due to increased customer and industry demands, reduced noise and vibration, lower costs, and improved performance in capacity and efficiency are desirable in the design and manufacture of fluid moving devices powered by electric motors. The methods, systems, and apparatus described herein facilitate reduced noise and vibration, lower costs, and improved performance in capacity and efficiency for an electric machine. This disclosure provides designs and methods to reduce noise and vibration, lower costs, and improved performance in capacity and efficiency. This disclosure further provides designs and methods to reduce reduced noise and vibration, lower costs, and improved performance in capacity and efficiency Technical effects of the methods, systems, and apparatus described herein include at least one of improved performance and quality and reduced labor costs.

According to an aspect of the present invention a sump pumping device 10 for pumping a fluid 12 is provided. The pumping device 10 includes a pump 14 adapted for pumping the fluid 12 and a power housing 16 connected to the pump 14. The pumping device 10 further includes a first motor 18 operably connected to the pump 14 and adapted to provide energy to the pump 14. At least a portion of the first motor 18 is positioned within the power housing 16. The pumping device 10 further includes a second motor 20 operably connected to the pump 14 and adapted to provide energy to the pump 14. At least a portion of the second motor 20 is positioned within the power housing 16.

It should be appreciated that the pump 14 may be positioned adjacent to and connected to the first motors 18 and/or second motor 20. It should be appreciated that the first motors 18 and/or second motor 20 as well as the pump 14 may be at least partially enclosed within the power housing 16. For example, the housing 16 may enclose both the motors 18 and/or 20 and the pump 14. Such a configuration may provide a more compact configuration that may more easily be fitted into the pit and may be more easily and quickly installed into the pit.

As shown in FIG. 1, the first motor and/or the second motor may be adapted to be operably connectable to a power source 22. The power source 22 may, for example, be an alternating current (AC) power source, a direct current (DC) power source, a water source, such as races, dams or tides, a water pressure source, a water reservoir, batteries of various voltage, a DC solar power source, a DC wind turbine power source, a AC wind turbine power source, a DC wind turbine power source, a AC wind turbine power source, or an AC power source. It should be appreciated that the first motor 18 and/or the second motor 20 may be adapted to be connected to any combination of the above power sources listed or to any other available power source.

It should be appreciated that the first motor 18 or the second motor 20 may be an induction motor, a permanent magnet motor, a switched reluctance motor, an electronically commutated motor (ECM) motor or an axial flux motor. It should be appreciated that the motors 18 and 20 may be motors of the same or of different types.

An electronically commutated motor hereinafter referred to as an ECM motor may be a brushless alternating current motor or a brushless direct current motor. An ECM motor may include a trapezoidal drive or a sinusoidal drive.

The axial flux motor may have a controller. The controller may be an electronic controller. The controller may be used to commutate the motor.

The switched reluctance motor may have a controller. The controller may be an electronic controller. The controller may be used to commutate the motor, As shown in FIG. 1, the sump pumping device 10 may include a battery 24. The sump pumping device may include a charging device 26 for charging the battery 24. It should further be appreciated that the charging may be de-sulfating charging, trickle charging, fast charging or deep cycle charging, or a combination of such charging.

As shown in FIG. 1, the sump pumping device 10 may be provided with an isolator 28, in the form of, for example, a back-up power system or battery system for isolating the device from power spikes and lightning strikes. As shown in FIG. 1, the isolator 28 may be a back-up power system or battery system 28 including the battery 24 and the charging device 26.

As shown in FIG. 1, the battery system 28 may be positioned in compartment 30 of housing 16.

As shown in FIG. 1, the sump pumping device 10 may be provided with a quick change or quick coupling system 40 such that the sump pumping device 10 is adapted for quick change. While the pump 14, the first motor 18 and the second motor 20 may each include a quick coupling (not shown) for quick change of these components, as shown, the entire sump pumping device 10 may be provided with quick coupling system 40 to quickly change the entire sump pumping device 10. For example and as shown, the quick coupling system 40 may include a quick power coupling 42, a quick mounting coupling 44 and a quick plumbing coupling 46. The couplings 42, 44 and 46 may be arranged such that the entire sump pumping device 10 is connected as it is lowered in position in pit 48.

Figure 2:
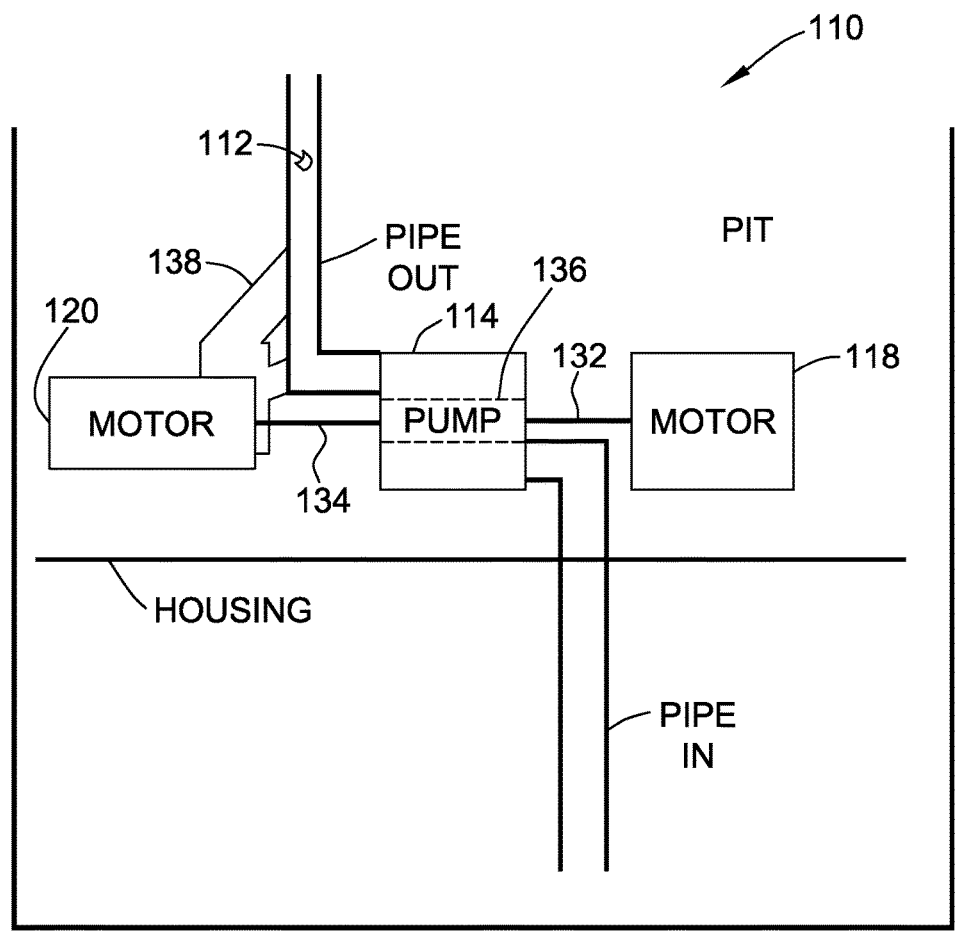
FIG. 2 is a plan view of an embodiment of the present invention in the form of a pumping device including pump driven by two motors.

Referring now to FIG. 2, another aspect of the present invention is shown as pumping device 110 for pumping a fluid 112 is shown. The pumping device 110 includes a pump 114 adapted for pumping the fluid 112 and a first motor 118 operably connected to the pump 114 and adapted to provide energy to the pump 114. The pumping device 110 also includes a second motor 120 operably connected to the pump 114 and adapted to provide energy to the pump 114.

For example and as shown in FIG. 2, the first motor 118 may be connected to the pump 114 by first shaft 132. Similarly, the second motor 120 may be connected to the pump 114 by second shaft 134. As shown, the first shaft 132 and the second shaft 134 may, as shown be collinear and be operably connected to pump shaft 136. Clutches and other mechanical mechanisms (not shown), as well as idling of the motor not in use, may be used to permit one of the motors 118 and 120 to be actively driving the pump 114 while the other motor is not in use, but ready to be used as a backup motor.

As shown in FIG. 2, sump pumping device 110 may be provided such that the first motor 118 and/or the second motor 120 is water cooled. It should be appreciated that the water cooled motor may be cooled by the fluid being pumped. It should be appreciated that the water cooled motor, shown as first motor 118, may include a water jacket, 138 surrounding at least a portion of the water cooled motor 118. It should be appreciated that the sump pumping device 110 may be a submersible or a semi-submersible pump.

It should be appreciated that the pump 114 may be positioned adjacent to and connected to the first motors 118 and/or second motor 120. It should be appreciated that the first motors 118 and/or second motor 120 as well as the pump 114 may be at least partially enclosed within a housing. For example, the housing may enclose both the motors 118 and/or 120 and the pump 114. Such a configuration may provide a more compact configuration that may more easily be fitted into the pit and may be more easily and quickly installed into the pit.

Figure 3:
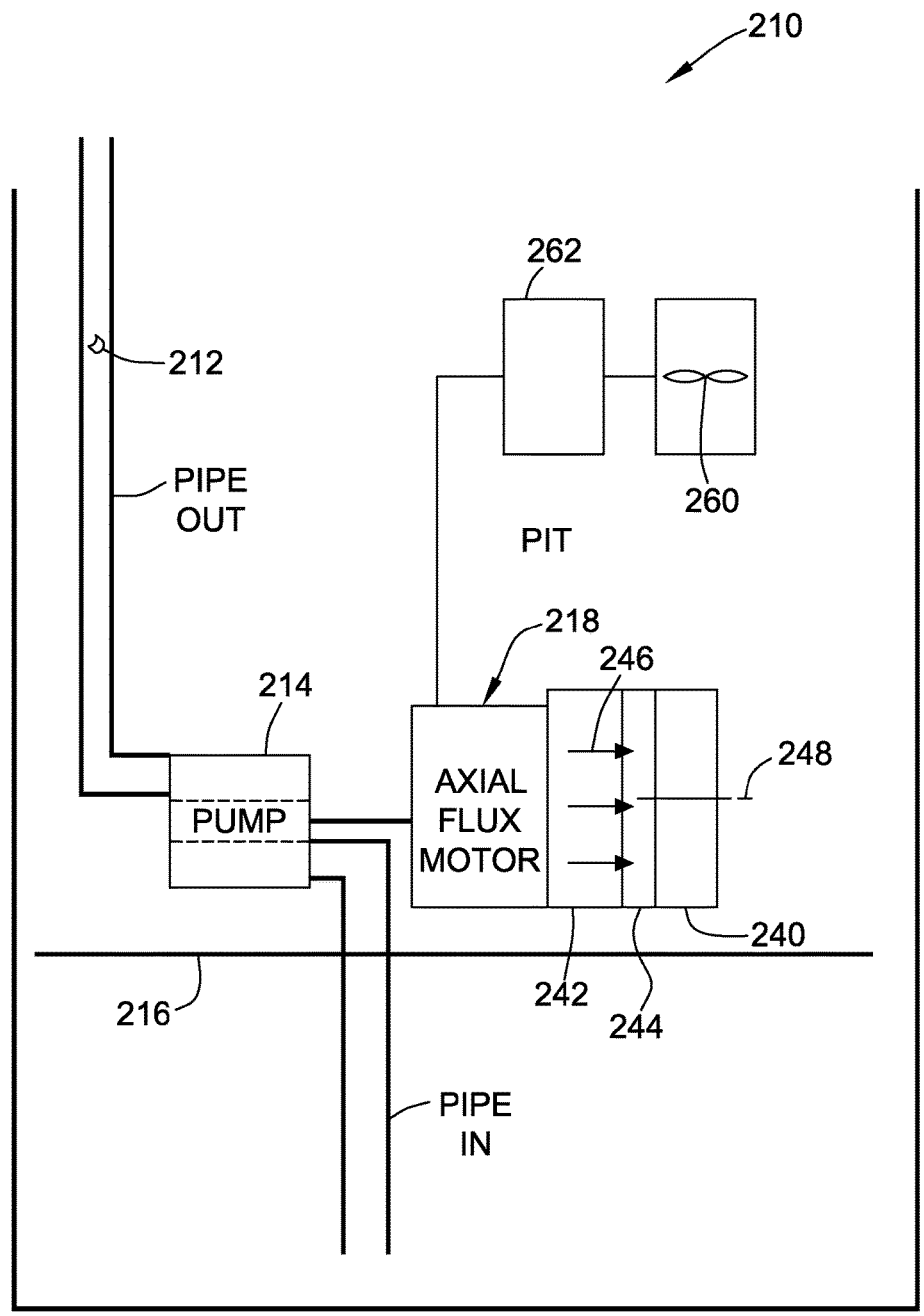
FIG. 3 is a plan view of an embodiment of the present invention in the form of a pumping device including an axial flux motor and a pump.

Referring now to FIG. 3, another aspect of the present invention is shown as pumping device 210 for pumping a fluid 212. The device 210 includes a pump 214 adapted for pumping the fluid 212 and a motor 218. The motor 218 has a stator 240 and a rotor 242 rotatably connected to the stator 240, by, for example, bearings 244. The rotor 242 and the stator 240 are adapted to generate flux 246 generally in a direction parallel to a rotational axis 248 of the motor 218. The motor 218 is operably connected to the pump 214 and is adapted to provide rotational mechanical energy to the pump 214. The pumping device 210 may include a power housing 216. A portion or all of the motor 218 may be positioned within the power housing 216. Further all or a portion of the pump 214 may be positioned within the power housing 216.

According to another aspect of the present invention the sump pumping device 210 may include a turbine 260. It should further be appreciated that the turbine 260 may be adapted to be positioned in a downspout, a pressurized water line, or a conduit connected to a water reservoir. It should further be appreciated that the turbine 260 may be connected to a generator 262. It should further be appreciated that the generator 262 may be connected to the motor 218.

Figure 4:
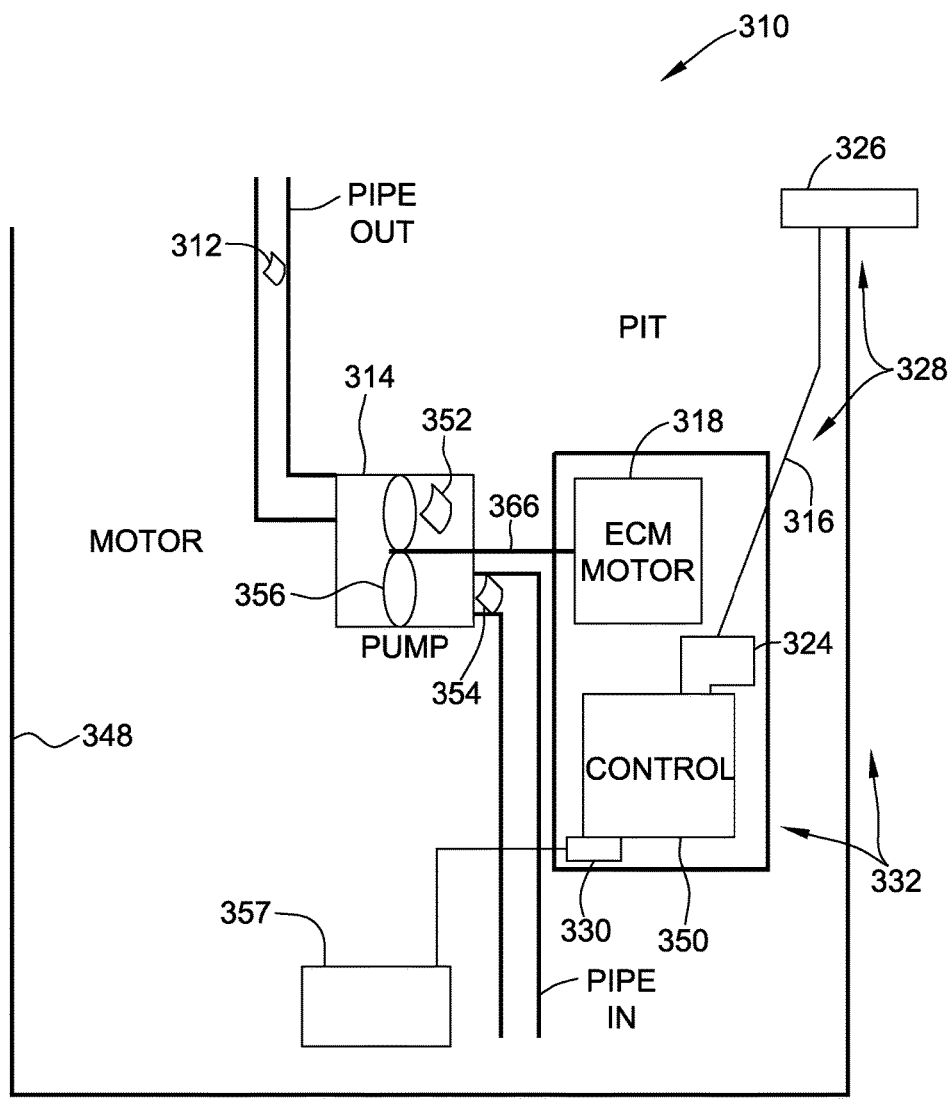
FIG. 4 is a plan view of an embodiment of the present invention in the form of a pumping device including an electronically commutated motor and a pump.

Referring now to FIG. 4, another aspect of the present invention is shown as pumping device 310 for pumping a fluid 312. The device 310 includes a pump 314 adapted for pumping the fluid 312 and an electronically commutated motor 318 operably connected to the pump 314 and adapted to provide energy to the pump 314. The device 310 also includes a controller 350 operably connected to the motor 318 and adapted to provide signals to the motor 318.

According to an aspect of the present invention the motor 318 may be adapted to operate at variable speeds. Such a motor 318 operable at different speeds may be, as shown, an ECM motor 318. It should be appreciated that the motor 318 with the variable speeds may have speeds adapted to match the incoming flow rate of the water in the pit 348. It should further be appreciated that the variable speeds of the motor with the variable speeds may be controlled to change the speeds of the motor to prevent water hammering.

According to another aspect of the present invention the motor 318 may be adapted to operate in a reverse direction to attempt to clear debris 352 from the intake 354 and/or the impeller 356. It should further be appreciated that the operation in the reverse direction may include a pulsing cycle to assist in clearing debris 352.

Further the impeller 356 may be so secured to shaft 366 that it will not release from the shaft 366 if turned in a direction opposed to the first direction.

According to another aspect of the present invention the sump pumping device 310 may include the controller 350. It should further be appreciated that the sump pumping device 310 may include means to connect power in for example line alternating or direct current to the controller 350. It should further be appreciated that the controller 350 may be adapted to charge a battery 324 with the AC or DC.

It should further be appreciated that the controller 350 may utilize DPT (direct power transfer) technology. It should further be appreciated that the controller 350 may be adapted to establish a signature or characteristics of the operating parameters of the system at initial startup and to compare actual operating parameters with the signature at initial startup. It should further be appreciated that the signature or characteristics include a torque profile. It should further be appreciated that the controller 350 may be adapted to monitor the relationship of power used to outgoing fluid flow rate and compare that outgoing fluid flow rate to incoming fluid flow rate to measure the proper operation of the overall system including at least one of check valves, pipe connections and pipe and other blockages. It should further be appreciated that the controller 350 may be adapted to operate at higher outputs to keep up with unusually high flow demands, such as those from heavy rains. It should further be appreciated that the controller 350 may be adapted to measure one of the torque, speed and power of the motor. It should further be appreciated that the controller may be adapted to determine a no load condition, based on temperature and one of the torque, speed and power of the motor.

It should be appreciated that the pump 314 may be positioned adjacent to and connected to the motor 318. It should be appreciated that the motor 318 as well as the pump 314 may be at least partially enclosed within housing 316. For example, the housing 316 may enclose both the motor 318 and the pump 314. Such a configuration may provide a more compact configuration that may more easily be fitted into the pit and may be more easily and quickly installed into the pit. It should further be appreciated that the controller 350 may be positioned, as shown, within the housing 316 or, alternatively outside the housing 316.

As shown in FIG. 4, the motor 318 is powered by a primary power source 357. Typically the primary power source 357 is line power for the residence and is typically 115 Volt or 230 Volt Alternating Current (AC). The primary power source 357 may be connected to the motor directly or as shown connected to the controller 350. The controller provides the primary power to the motor 318.

As shown in FIG. 4, the pumping device 310 may include a charging device or solar panel 326 for charging the battery 324. It should further be appreciated that the charging may be de-sulfating charging, trickle charging, fast charging or deep cycle charging, or a combination of such charging.

As shown in FIG. 4, the battery 324 and the charging device 326 combine to form a backup power system or a battery system 328.

The charging device 326 may be a solar panel. The solar panel may be adapted to provide sufficient power to operate the motor 318. Alternatively the panel 326 may only provide sufficient power to the controller 350 in the form of for example a microcontroller. The panel may also power a communication circuit (not shown) and other devices including for example a relay circuit (not shown). Such a solar panel may only need to provide a few watts of power.

The backup power system 328 may serve several purposes. One purpose is to provide power is that even there is no primary power 357, the panel 326 of the backup power system 328 will be able provide backup power for communication to the controller 350. This backup power may be used to provide information to the user to find out status of the pumping device 310 and do diagnostics on the pumping device 310.

Another purpose of the backup power system 328 is that the backup power system 328 in combination with an isolation circuit 330 forms an isolation system 332 that we will be able to isolate the controller 350 from the primary power 357 when the motor 318 is not running.

The primary power 357 is typically obtained from a power company that provides the power from a wide distribution network or power grid. The power grid is susceptible to power spikes and/or lightning strikes that can cause extensive damages to the residence including damage to electrical components, particularly electronic devices.

It should be appreciated that in the majority of time the pump 314 and motor 318 are not running. During that time by disconnecting the controller 350 from the primary power 357 or grid, the number of transients (including power surges and lightning strikes) the controller 350 may experience will be reduced. This reduction will, in return, extend the life of the pumping device 310.

The isolation circuit 330 may be designed as a redundant circuit. If the isolation circuit 330 fails, it will default to a connected state to grid so that the pump drive still can function. Iii such failure the isolation circuit 330 would provide a closed electrical connection between the primary power 357 and the controller 350. When the isolation circuit 330 is working properly, during the time when the pump 314 and the motor 318 are not running, which is most of the duty cycle, the circuit 330 provides an open or disconnected electric connection between the primary power 357 and the controller 350 and an open or disconnected electric connection between the primary power 357 and the motor 318. During the time when the circuit 330 provides an open or disconnected electric connection, the power to operate such circuit 330 and the power to operate such controller 350 is obtained from the backup power system 328.

It should be appreciated that the pumping device 310 may be used for a sump pump, as shown, or for a pool or spa. When used for a pool or spa, since such pool or spa is typically located outside or in direct exposure to the sun, using a solar panel as a charging device may be desirable. In such case, when the pump is located in direct exposure to the sun, the solar panel 326 may be directly attached to the controller 360.

Figure 5:
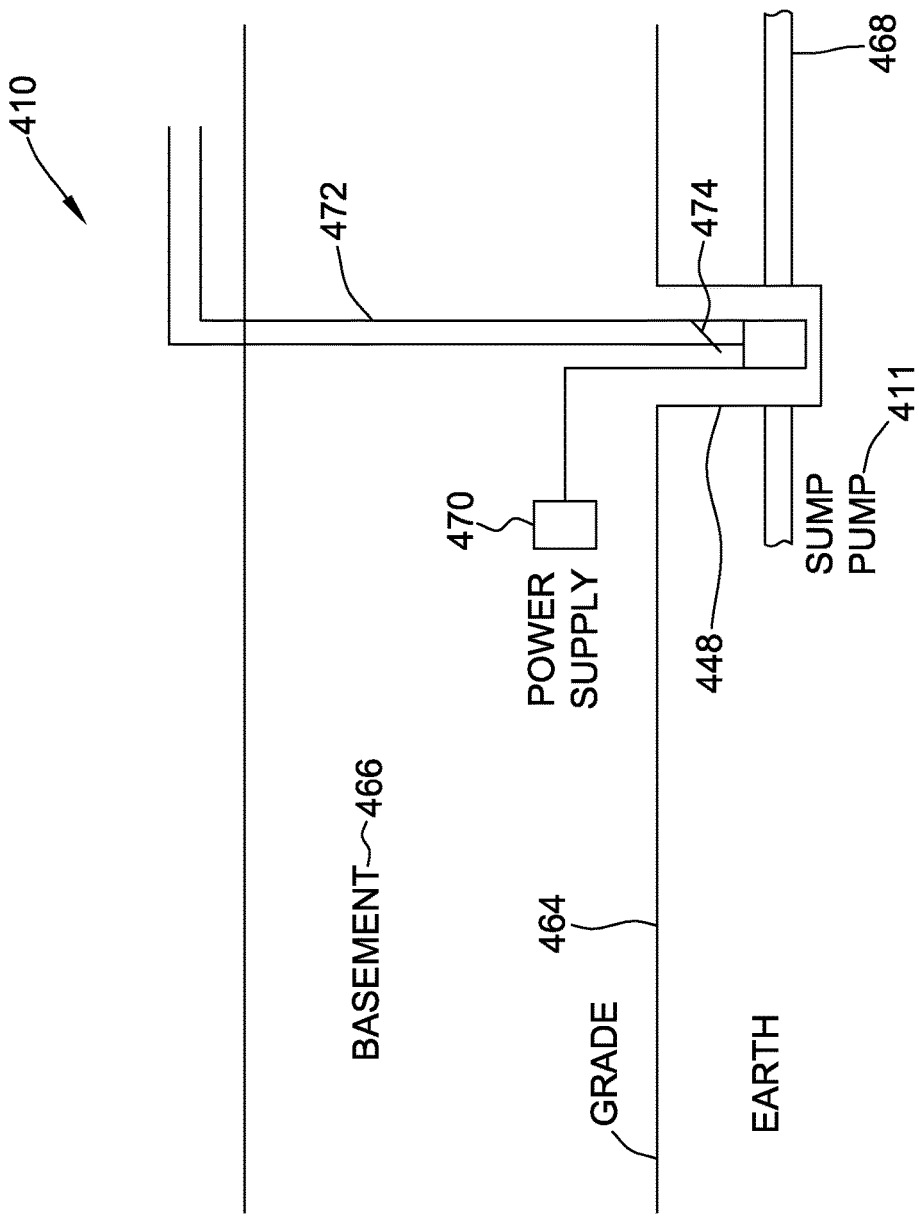
FIG. 5 is a schematic drawing of an embodiment of the present invention in the form of a fluid flow system.

Referring now to FIG. 5, another aspect of the present invention is shown as fluid flow system 410. The system 410 includes a pit 448 formed in floor 464 of basement 466. Drain lines 468 positioned around periphery of basement 466 are fed into pit 448 providing a conduit for subterranean water to flow into the pit 448. A sump pump 411 is placed in the pit 448 and is connected to discharge plumbing 472. The sump pump 411 may be any pump as disclosed as embodiments of the present invention herein. The pump 411 is powered by power supply 470. A check valve 474 is placed in the discharge plumbing to prevent water from returning to the pit 448 when the pump 411 is not running.

Figure 6:
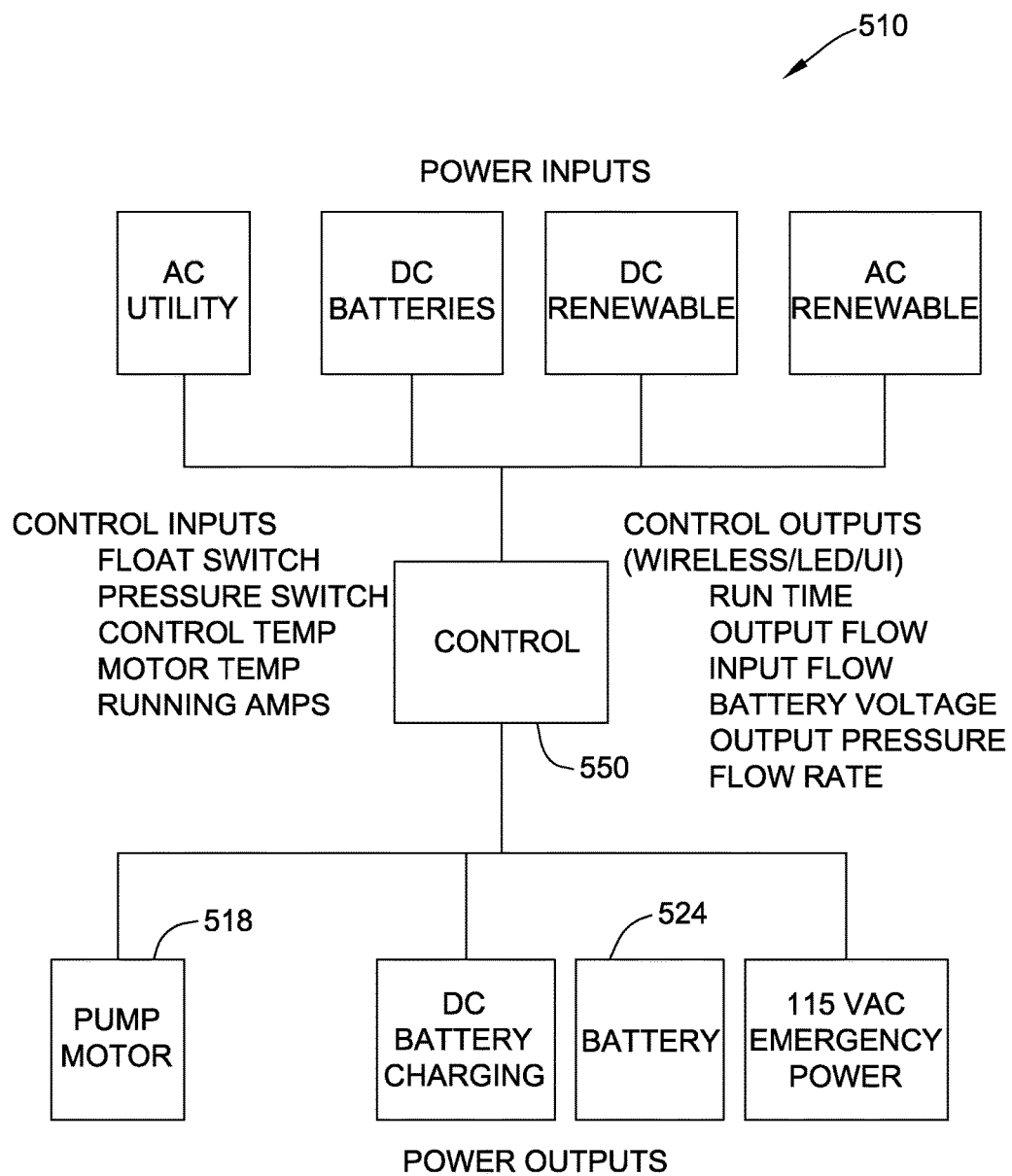
FIG. 6 is another schematic drawing of an embodiment of the present invention in the form of a fluid flow system.

Referring now to FIG. 6, another aspect of the present invention is shown as fluid flow system 510. The system 510 includes a pump motor 518 that may be any motor as disclosed as embodiments of the present invention herein. The motor 418 is controlled by control or controller 550. The controller 550 may have inputs including a float switch, a pressure switch, a controller temperature, a motor temperature and motor information including running amperes. The controller 550 may have outputs including run time, output flow, input flow, battery voltage, output pressure and pump flow rate. The controller 550 may provide signals to the motor 518 for controlling the motor 518. The system 510 may further include a battery 524 for providing direct current to the system 510. The controller 550 may further provide an output for charging the battery 524. The controller 550 may further provide an output in the form of 115 Volt AC emergency power. The system may obtain power for the system from AC utility power, from DC batteries, from DC renewable sources, such as wind or solar, and from AC renewable sources, such as wind or solar.

Figure 7:
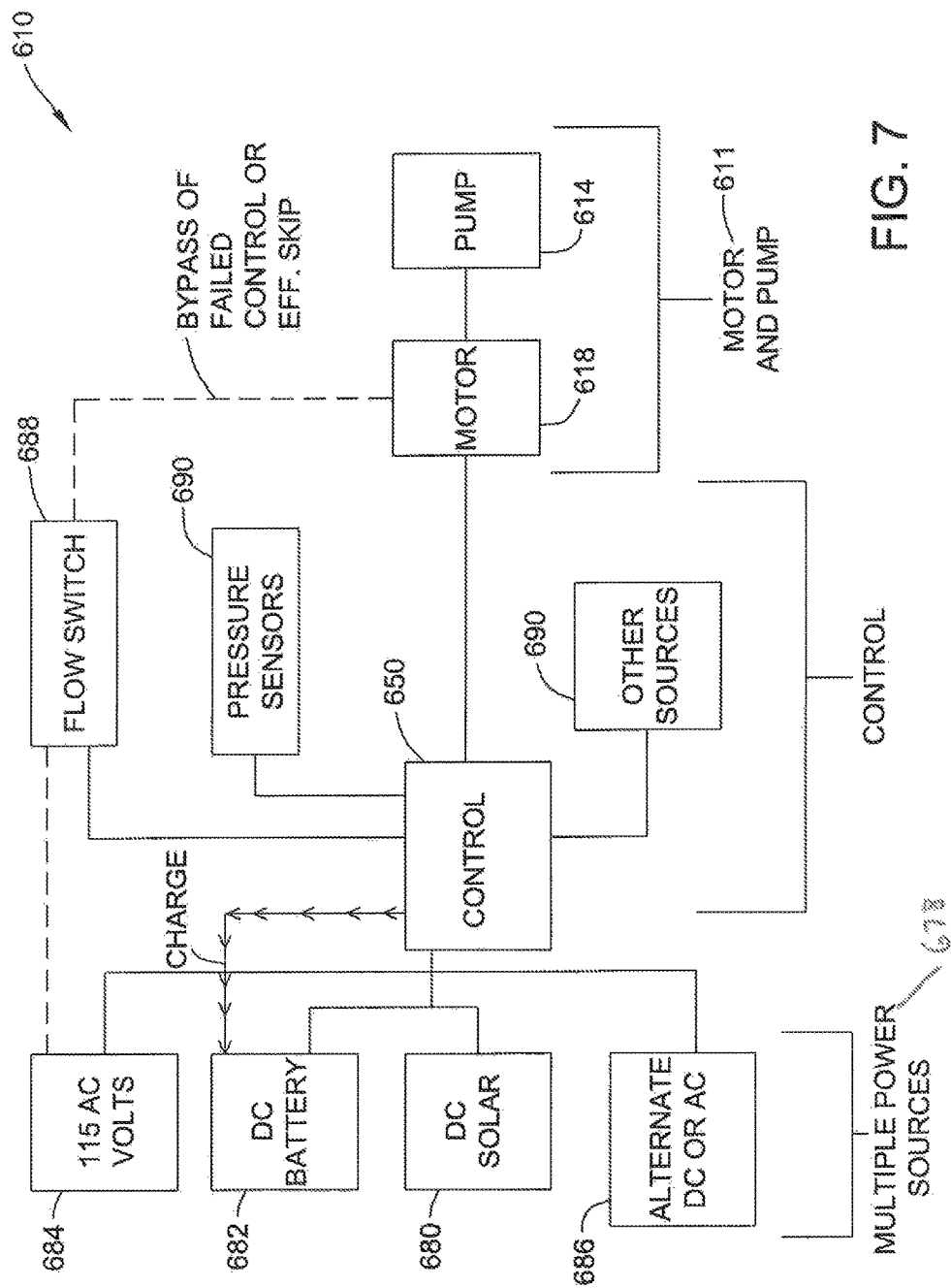
FIG. 7 is yet another schematic drawing of an embodiment of the present invention in the form of a fluid flow system.

Referring now to FIG. 7, another aspect of the present invention is shown as fluid flow system 610. The system 610 includes a sump pump 611 including a motor 618 that may be any motor as disclosed as embodiments of the present invention herein. The sump pump 611 also includes a pump 618. The motor 618 is controlled by controller 650. The motor 618 is powered by one or more power sources 678. The power sources 678 may include DC Solar 680, DC battery 682, 115 AC 684, alternate AC and DC 686. The controller 650 may be used to charge battery 682. The system may include signal detecting devices such as a flow switch 688, pressure sensors 690 and other detecting sources 692 such as temperature sensors, current sensors, and voltage sensors. The motor 618 may be directly connected to a flow switch to operate and stop the motor if the controller 650 fails.

Figure 8:
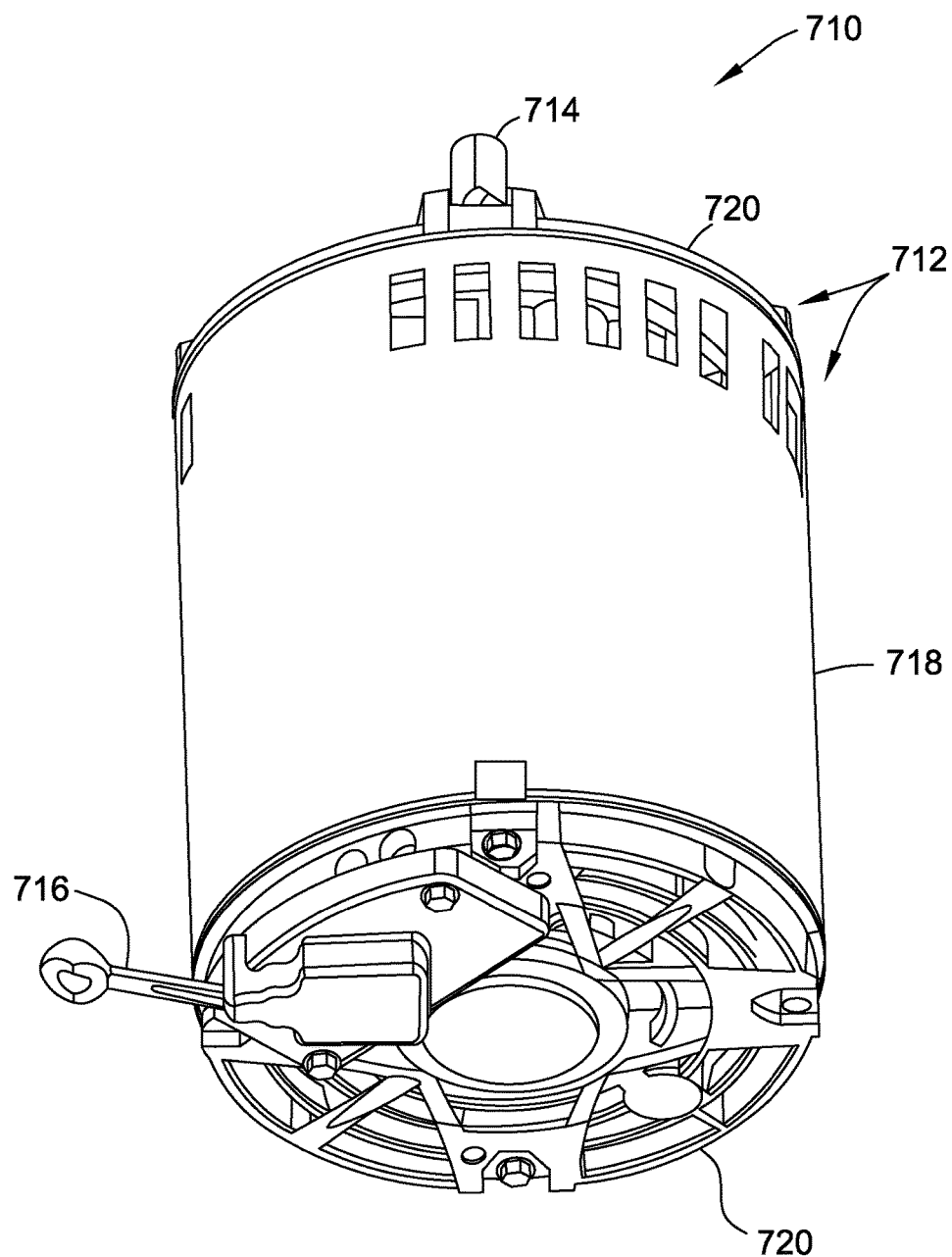
FIG. 8 is a perspective view of an embodiment of the present invention in the form of a motor assembly including two motors in a common housing.
Figure 9:
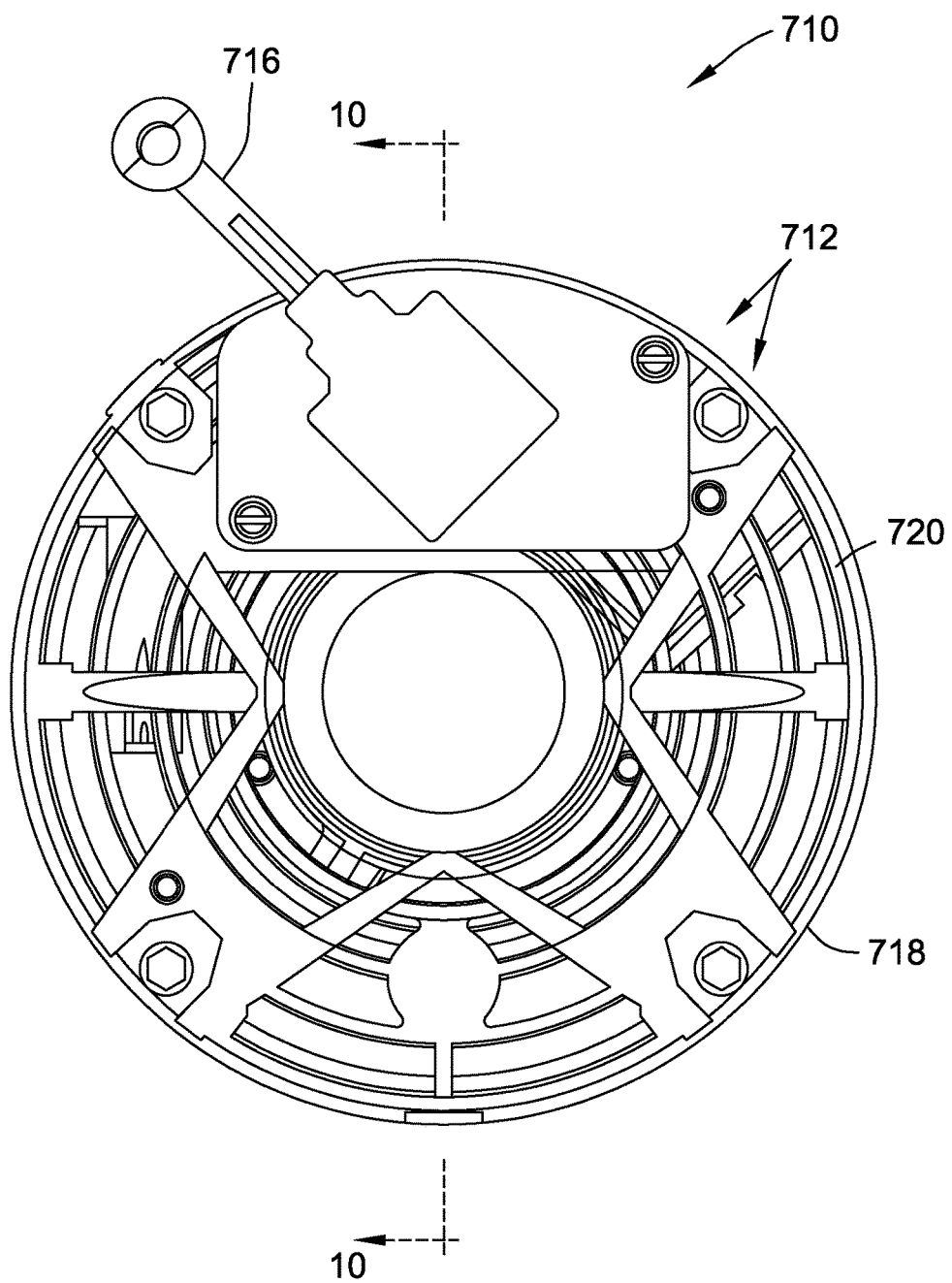
FIG. 9 is a plan view of the motor assembly of FIG. 8.
Figure 10:
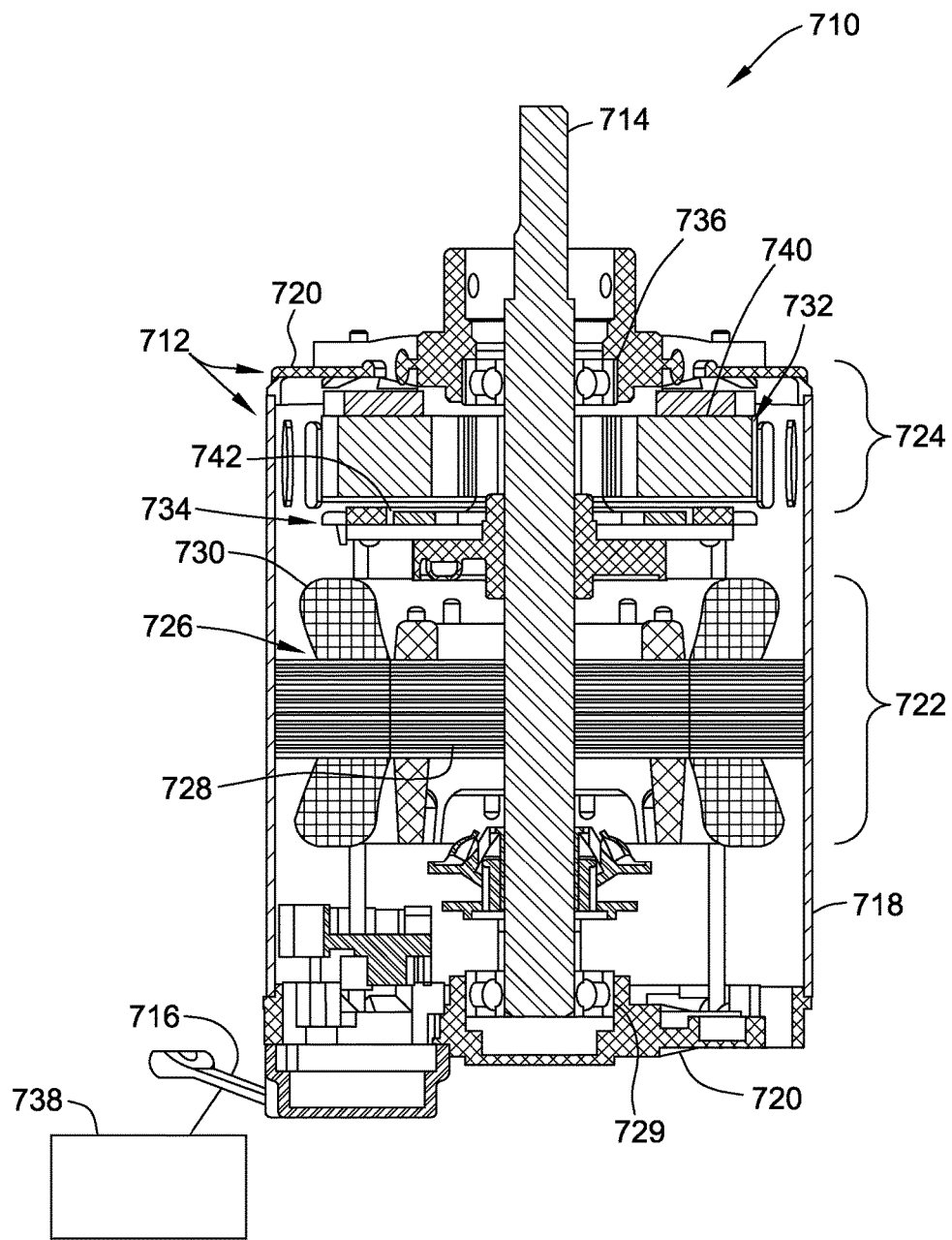
FIG. 10 is a partial cross sectional view of FIG. 9 along the line 10-10 in the direction of the arrows.

Referring now to FIGS. 8-10, another aspect of the present invention is shown as a motor 710 for use with a pump for removing fluid collected from the subterranean surface adjacent a building is provided.

As shown in FIGS. 8 and 9, the motor 710 includes a housing 712 and an output shaft 714 configured for connection to the pump. The motor 710 is adapted to provide energy to the pump through the output shaft 714. The motor is connected to a power source (not shown) by a power lead

716. While the housing 712 may be unitary, as shown in FIG. 8, the housing 712 includes a cylindrical shell 718 and opposed end caps 720.

It should be appreciated that the motor 710 may be positioned adjacent to and connected to the pump. It should be appreciated that the motor 710 and the pump (not shown) may both be at least partially enclosed in the housing 712. For example, the housing 712 may enclose both the motor 710 and the pump. Such a configuration may provide a more compact configuration that may more easily be fitted into the pit and may be more easily and quickly installed into the pit.

Referring now to FIG. 10, the motor 710 includes a first motor 722 and a second motor 724. The use of two motors 722 and 724 provides for an active motor when and if one of the two motors fails. While not shown the motors 722 and 724 may be equipped with a clutch that releases the motor when its failure occurs so that the working motor may operate in the event that the fail motor seizes. The first motor 722 is operably connected to the pump and is adapted to provide energy to the pump. As shown, at least a portion of the first motor 722 is positioned within the housing 712. As shown, the first motor 722 is substantially positioned within the housing 712. Likewise, the second motor 724 is operably connected to the pump and is adapted to provide energy to the pump. As shown, at least a portion of the second motor 724 is positioned within the housing 712. As shown, the second motor 724 is substantially positioned within the housing 712.

While the first motor 722 and the second motor 724 may be any suitable motors, as shown, the first motor 722 is an induction motor and the second motor 724 is an axial flux motor. The first motor 722 may be the primary motor and may be connected to line voltage of for example 115 V AC. The second motor 724 may be the backup motor and may be connected to line voltage and/or back up power in the form of for example, battery 12 Volt power.

As shown the first motor 722 may include a first motor stator 726 connected to the housing 712 and a first motor rotor 728 rotatably connected to the stator 726 by bearings 729. The first motor stator 726 and/or the first motor rotor 728 may include electromagnetic coils. As shown, the stator 726 has electromagnetic coils or windings 730. While as shown the first motor 722 is an induction motor, it should be appreciated that the first motor may be a permanent magnet motor with permanent magnets fitted to the rotor.

The second motor 724 may, as shown, be an axial flux motor. As shown the second motor 724 may include a second motor stator 732 connected to the housing 712 and a second motor rotor 734 rotatably connected to the second motor stator 732 by bearings 736. As shown the second motor 724 is a variable speed motor. For example the second motor 724 is an electronically commutated motor. For example the electronically commutated motor may use a trapezoidal drive or a sinusoidal drive. The second motor 724 may also includes a controller 738 operably connected to the second motor 724. The controller serves to control the second motor and may be used to adjust the speed of the second motor 724. The controller 738 may, as shown, be external to the housing 712 or may alternatively be positioned within the housing 712.

The second motor stator 732 and/or the second motor rotor 734 may include electromagnetic coils. As shown the first motor stator 732 has electromagnetic coils or windings 740. The second motor rotor 734 of the second motor 724 may, as shown, include permanent magnets 742 connected to the rotor 734.

As shown, the motor 710 may include a temperature sensor (not shown) positioned adjacent one of the windings 730 or 740 and the controller 738. The controller 738 and the sensor adapted to monitor the temperature of either or both of the windings 730 and 740 and the controller 738. It should further be appreciated that the controller 738 may be adapted to utilize a temperature obtained from temperature sensor to maximize system performance.

As shown the second motor 724 is a variable speed motor that may includes speeds to match with the pump and the system requirements to maximize flow and efficiency or both.

As shown the first motor 722 and/or the second motor 724 may be a high speed motor. It should further be appreciated that the high speed motor may be adapted to operate at around 18,000 RPM or higher.

It should be appreciated that the second motor may be an ECM motor. The use of an axial flux motor as the second motor 724 provides for a motor with reduced length along the rotational axis. Such shorter length of the motor may be advantageous for fitting the motor 710 into a sump pit. It should further be appreciated that the second motor may be a backup motor. It should further be appreciated that the backup motor may be periodically operated. It should further be appreciated that the controller may be configured to perform diagnostics on the system using outputs from the second motor 724, whether a primary or a backup motor.

It should be appreciated that the motor 710 may be configured such that first motor stator 726 of the first motor 722 may operate at a high voltage and the second motor stator 732 of the second motor 724 may operate at a low voltage. It should be appreciated that the low voltage may be 50 volts or less. It should be appreciated that the high voltage may be 100 volts or greater.

It should be appreciated that the motor 710 may be configured such that the winding 730 of the first motor 722 may operate at a high voltage and the winding 740 of the second motor 724 may operate at a low voltage. It should be appreciated that the motor 710 may include a switching mechanism (not shown). It should be appreciated that the switching mechanism may be adapted to switch the first winding and/or the second winding between a first mode in which the winding operates at a high voltage and second mode in which the winding operates at a low voltage.

It should be appreciated that the controller 738 may be adapted to provide for wireless monitoring. It should be appreciated that the wireless monitoring may be from one of a computer desktop or a portable computer device. It should be appreciated that the portable computer device may be an iphone, a tablet or an android.

Figure 11:
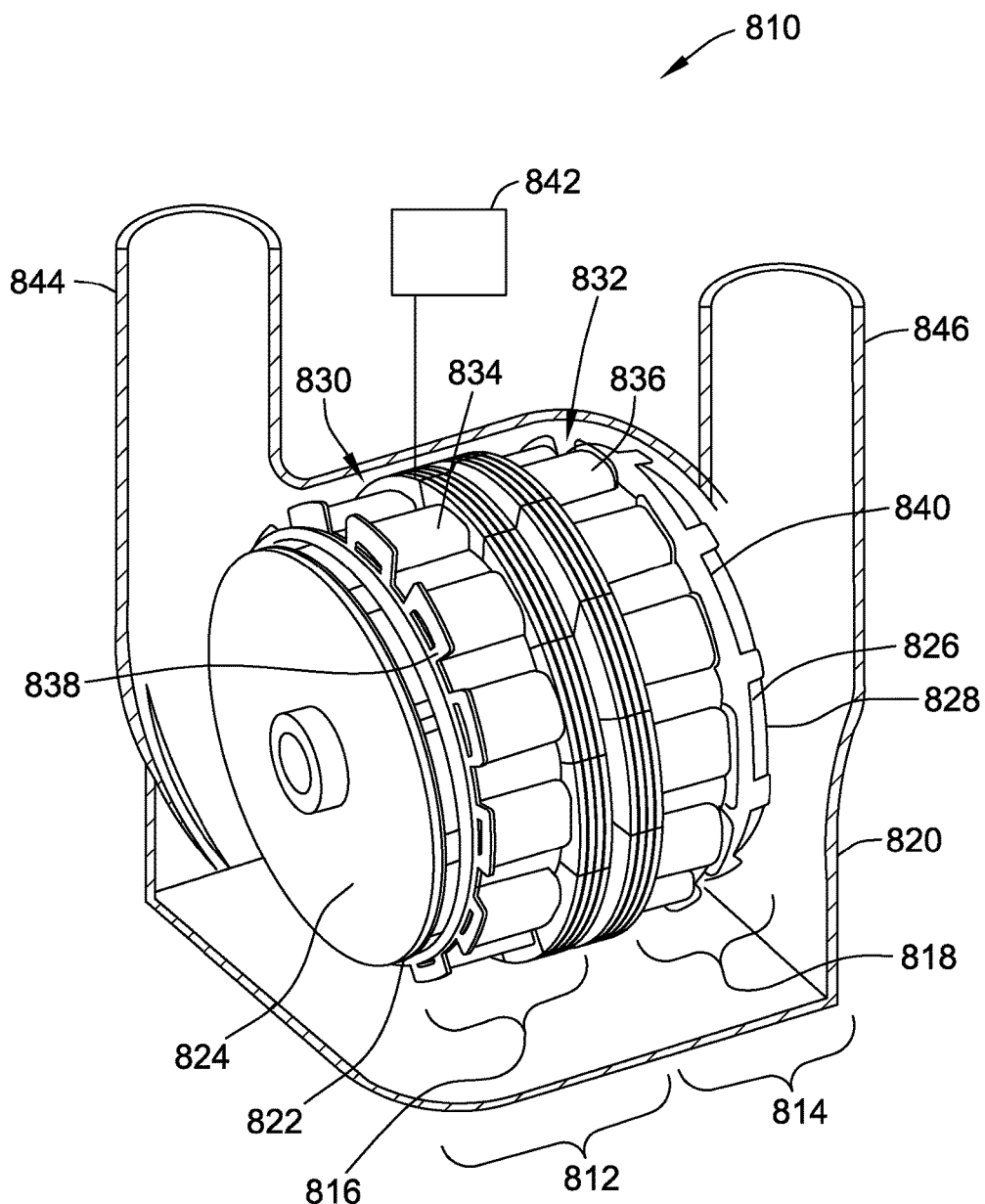
FIG. 11 is a perspective view of another embodiment of the present invention in the form of a sump pump including two pumps, each with its own motor in a common housing.

Referring now to FIG. 11, another aspect of the present invention is shown as a pumping device 810 for removing fluid collected from the subterranean surface adjacent a building is provided. Unlike the pumping devices of FIGS. 1-10, the pumping device 810 includes a first pump 812 and a second pump 814.

The first pump 812 is driven by first motor 816 and likewise the second pump 814 is driven by second motor 818. The use of two motors 816 and 818 provides for an active motor when and if one of the two motors fails. The rotating components of the motors 816 and 818 are not connected to each other, such that when a rotation component of one motor seizes, such a seizure does not affect the other motor. The first motor 816 is operably connected to the first pump 812 and is adapted to provide energy to the first pump 812. Likewise, the second motor 818 is operably connected to the second pump 814 and is adapted to provide energy to the second pump 814.

As shown, the pumping device 810 includes a housing 820. As shown, at least a portion of the first motor 816 is positioned within the housing 820. As shown, the first motor 816 is substantially positioned within the housing 820. Likewise, at least a portion of the second motor 818 is positioned within the housing 820. As shown, the second motor 818 is substantially positioned within the housing 820.

As shown, at least a portion of the first pump 812 is positioned within the housing 820. As shown, the first pump 812 is substantially positioned within the housing 820. Likewise, at least a portion of the second pump 814 is positioned within the housing 820. As shown, the second pump 814 is substantially positioned within the housing 820.

While the first motor 816 and the second motor 818 may be any suitable motors, as shown, the first motor 816 and the second motor 818 are axial flux motors. Preferably one of these axial flux motors is an electronically commutated motor. At least one of the axial flux motors could be a non-electronically commutated motor. For example one of the motors, the second motor 818 could be a non variable speed line start axial flux motor.

As shown in FIG. 11, the first motor 816 include a first motor rotor 822. Further, the first pump 812 may include a first pump impeller 824. As shown, the first motor rotor 822 and the first pump impeller 824 may be juxtaposed and operably connected to each other. It should be appreciated that the first motor rotor 822 and the first pump impeller 824 may be integral to each other. It should be appreciated that the first pump impeller 824 and the housing 820 substantially include the first pump 812.

Further, the second motor 818 include a second motor rotor 826. Further, the second pump 814 may include a second pump impeller 828. As shown, the second motor rotor 826 and the second pump impeller 828 may be juxtaposed and operably connected to each other. It should be appreciated that the second motor rotor 826 and the second pump impeller 828 may be integral to each other. It should be appreciated that the second pump impeller 828 and the housing 820 substantially include the second pump 814.

The first motor 816 may also include a first motor stator 830 operably associated with the first motor 816. Similarly, the second motor 818 may also include a second motor stator 832 operably associated with the second motor 818.

It should be further appreciated that the first motor stator 830 or the second motor stator 832 may operate at a high voltage and that the other of first motor stator 830 or the second motor stator 832 may operate at a low voltage.

As shown, the first motor stator 830 includes first motor stator coils or windings 834 for generating a electromagnetic flux and the second motor stator 832 includes first motor stator coils or windings 836 for generating a electromagnetic flux.

Also, the first motor rotor 822 includes first motor rotor magnets 838 for generating magnetic flux and the second motor rotor 826 includes second motor rotor magnets 840 for generating magnetic flux.

As shown, the pumping device 810 further includes a control or controller 842 for controlling at least one of the first motor 816 and the second motor 818. The controller 842 serves to control the second motor, provided the second motor 818 is a variable speed motor, for example a variable speed electronically commutated motor. It should be appreciated that the first motor 816 may be controlled by the controller 842, particularly if the first motor 816 is a variable speed motor.

As shown, the first pump 812 includes a first pump inlet (not shown) and a first pump outlet 844. As shown, the second pump 814 includes a second pump inlet (not shown) and a second pump outlet 846.

Figure 12:
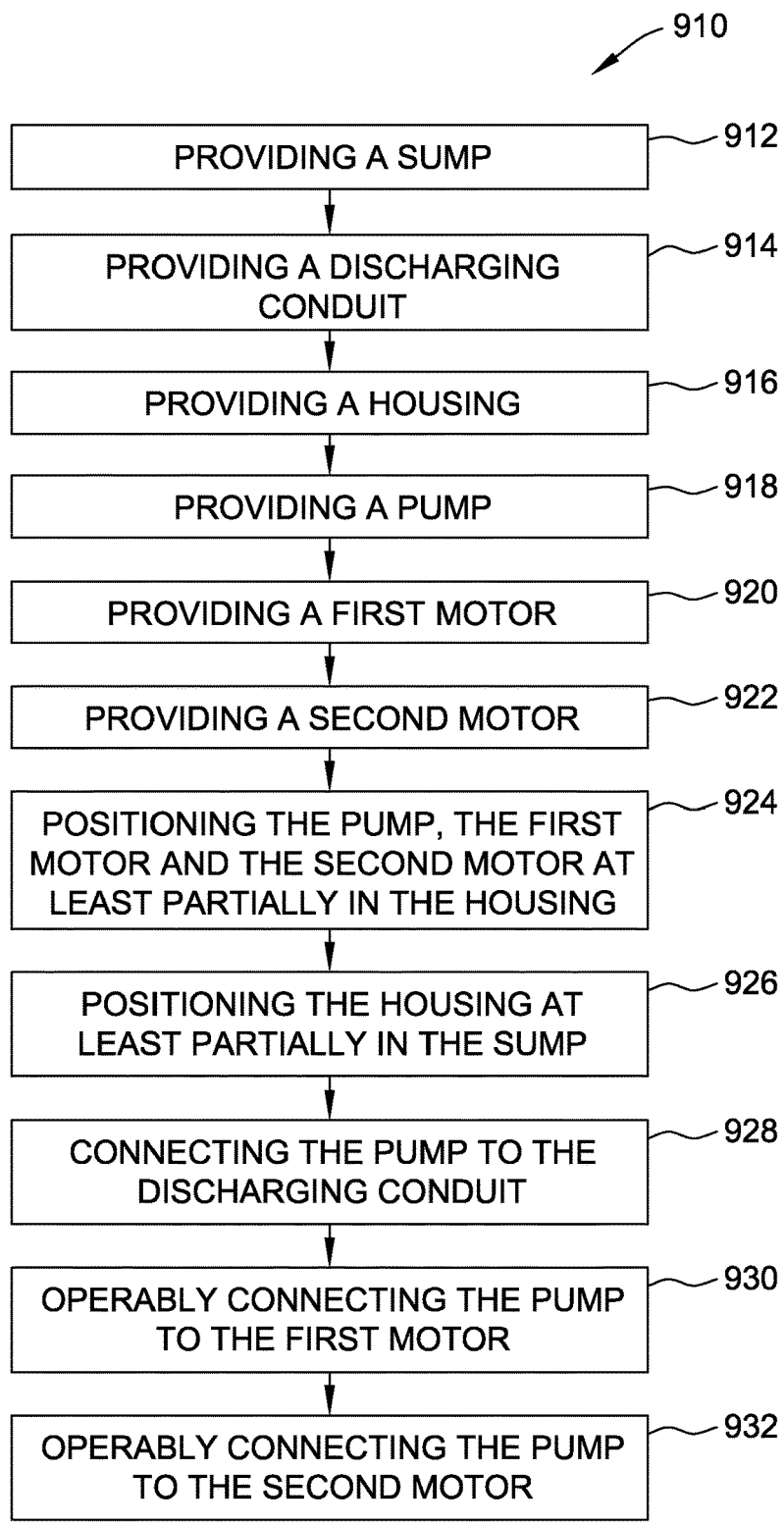
FIG. 12 is a flow chart of a method of removing fluid according to another aspect of the present invention.

Referring now to FIG. 12, another aspect of the present invention is shown as a method 910 for removing fluid from subterranean surface of a building. The method includes step 912 of providing a sump, step 914 of providing a discharging conduit, step 916 of providing a housing, step 918 of providing a pump, step 920 of providing a first motor, and step 922 of providing a second motor. The method also includes step 924 of positioning the pump, the first motor and the second motor at least partially in the housing. The method also includes step 926 of positioning the housing at least partially in the sump and step 928 of connecting the pump to the discharging conduit. The method also includes step 930 of operably connecting the pump to the first motor and step 932 of operably connecting the pump to the second motor.

According to an aspect of the present invention, a sump pumping device for pumping a fluid is provided. The pumping device includes a pump adapted for pumping the fluid and a power housing connected to the pump. The pumping device further includes a first motor operably connected to the pump and adapted to provide energy to the pump. At least a portion of the first motor is positioned within the power housing. The pumping device further includes a second motor operably connected to the pump and adapted to provide energy to the pump. At least a portion of the second motor is positioned within the power housing.

According to an aspect of the present invention, the first motor and/or the second motor may be adapted to be operably connectable to AC power, to DC power, to water pressure, to a water reservoir, to a water source, such as races, darns or tides, to batteries of various voltage, to DC solar power, to DC wind turbine power, to AC wind turbine power, to DC wind turbine power, to AC wind turbine power, and/or to AC power. It should be appreciated that the motor may be adapted to be connected to any combination of power sources listed or to any other available power source.

According to another aspect of the present invention, the first motor or the second motor may be an induction motor, a permanent magnet motor, a switched reluctance motor, an electrically commutated motor (ECM) motor or an axial flux motor. It should be appreciated that the other motor may be a motor of the same or different type.

An electronically commutated motor hereinafter referred to as an ECM motor may be a brushless alternating current motor or a brushless direct current motor. An ECM motor may include a trapezoidal drive or a sinusoidal drive.

Other motors, in addition to those which fall into the ECM description, yet have controllers, may be used for the invention herein. For example, the first motor and/or the second motor may be a switched reluctance motor or an axial flux motor having a controller. The controller may be an electronic controller. The controller may be used to commutate the motor, According to another aspect of the present invention, the first motor or the second motor may be adapted to operate at variable speeds. Such a motor operable at different speeds may be an ECM motor. It should be appreciated that the variable speeds of the motor with the variable speeds may have speeds adapted to match the incoming flow rate of the water in the pit. It should further be appreciated that the variable speeds of the motor with the variable speeds may be controlled to change the speeds of the motor to prevent water hammering.

According to another aspect of the present invention, the first motor or the second motor may be adapted to operate in a reverse direction to attempt to clear debris from one of the intake and or impeller. It should further be appreciated that the operation in the reverse direction may include a pulsing cycle to assist in clearing debris.

According to another aspect of the present invention, the sump pumping device may include a battery. It should further be appreciated that the sump pumping device may include a charging device for charging the battery. It should further be appreciated that the charging is one of desulfating, trickle charge, fast charging and deep cycle charging.

According to another aspect of the present invention, the sump pumping device may include a controller. It should further be appreciated that the sump pumping device may include means to connect AC to the controller. It should further be appreciated that the controller may be adapted to charge the battery with the AC.

According to another aspect of the present invention, the sump pumping device may include a turbine. It should further be appreciated that the turbine may be adapted to be positioned in a downspout, a pressurized water line, or a conduit connected to a water reservoir. It should further be appreciated that the turbine may be connected to a generator. It should further be appreciated that the generator may be connected to the first motor and/or the second motor.

According to another aspect of the present invention, the sump pumping device may include a controller. The controller may control the operation of the motor. It should further be appreciated that the controller may utilize DPT (direct power transfer) technology. It should further be appreciated that the controller may be adapted to establish a signature or characteristics of the operating parameters of the system at initial startup and to compare actual operating parameters with the signature at initial startup. It should further be appreciated that the signature or characteristics include a torque profile. It should further be appreciated that the controller may be adapted to monitor power used to fluid flow rate and compare that flow to incoming fluid to measure the proper operation of the overall system including at least one of check valves, pipe connections and pipe and other blockages. It should further be appreciated that the controller may be adapted to operate at higher outputs to keep up with unusually high flow demands, such as those from heavy rains. It should further be appreciated that the controller may be adapted to measure one of the torque, speed and power of the motor. It should further be appreciated that the controller may be adapted to determine a no load condition, based on temperature and one of the torque, speed and power of the motor.

According to another aspect of the present invention, the sump pumping device may be configured such that the first motor and/or the second motor may include windings. It should further be appreciated that the sump pumping device may further include a controller. It should further be appreciated that the sump pumping device may further include a temperature sensor positioned adjacent one of the windings and the controller, the controller and the sensor adapted to monitor the temperature of one of the windings and the controller. It should further be appreciated that the controller may be adapted to utilize a temperature obtained from temperature sensor to maximize system performance.

According to another aspect of the present invention, the sump pumping device may be provided with the pump having an impeller. Further the first motor and/or the second motor may include a shaft. Further the first motor and/or the second motor may be adapted to rotate in a first direction. Further the impeller may be so secured to the shaft that it will not release from the shaft if turned in a direction opposed to the first direction.

According to another aspect of the present invention, the sump pumping device may be provided such that the first motor and/or the second motor is a variable speed motor and such that the pump and the system requirements are matched to maximize at least one of flow and efficiency.

According to another aspect of the present invention, the sump pumping device may be provided such the first motor and/or the second motor is a high speed motor. It should further be appreciated that the high speed motor may be adapted to operate at around 18,000 RPM or higher.

According to another aspect of the present invention, the sump pumping device may be provided with an isolator for isolating the device from power spikes and lightning strikes. It should further be appreciated that the isolator may be a battery system.

According to another aspect of the present invention, the sump pumping device may be provided such that the first motor and/or the second motor may be an ECM motor. It should be appreciated that the sump pumping device may further include a controller. It should further be appreciated that the ECM motor may be a backup motor. It should further be appreciated that the backup motor may be periodically operated. It should further be appreciated that the controller may be configured to perform diagnostics on the system, whether a primary or a backup motor.

According to another aspect of the present invention, the sump pumping device may be provided such that the first motor and/or the second motor are water cooled. It should be appreciated that the water cooled motor may be cooled by the fluid being pumped. It should be appreciated that the water cooled motor may include a water jacket surrounding at least a portion of the water cooled motor. It should be appreciated that the sump pumping device may be a submersible or a semi-submersible pump.

According to another aspect of the present invention, the sump pumping device may be provided such that the first motor and/or the second motor may include a first stator and a second stator. It should be appreciated that the first stator may operate at a high voltage and the second stator may operate at a low voltage. It should be appreciated that the low voltage may be 50 volts or less. It should be appreciated that the high voltage may be 100 volts or greater According to another aspect of the present invention, the sump pumping device may be provided such that the first motor and/or the second motor include a stator having a first winding and a second winding. It should be appreciated that the first winding may operates at a high voltage. It should be appreciated that the second winding may operates at a low voltage, it should be appreciated that the sump pumping device may include a switching mechanism. It should be appreciated that the switching mechanism may be adapted to switch the first winding and/or the second winding between a first mode in which the winding operates at a high voltage and second mode in which the winding operates at a low voltage.

According to another aspect of the present invention, the sump pumping device may include a controller adapted to provide for wireless monitoring. It should be appreciated that the wireless monitoring may be from one of a computer desktop or a portable computer device. It should be appreciated that the portable computer device may be an iphone, a tablet or an android.

According to another aspect of the present invention, the sump pumping device may be provided such that the first motor, the second motor and/or the pump is adapted for quick change.

According to another aspect of the present invention, the sump pumping device may include a housing. It should be appreciated that the pump, the first motor and/or the second motor may at least partially be positioned in the housing. It should be further appreciated that the pump, the first motor and the second motor may all be at least partially positioned in the housing.

According to another aspect of the present invention, the first motor and/or the second motor include a rotor. It should be appreciated that the pump may include an impeller. It should be appreciated that the rotor and the impeller may be juxtaposed and operably connected to each other. It should be appreciated that the rotor and the impeller may be integral to each other. It should be appreciated that the impeller and the housing substantially include the pump. It should be appreciated that the sump pumping device may include a second pump. It should be further appreciated that the first pump and the first motor may be at least partially positioned in the housing and operably associated with each other, it should be further appreciated that the second pump and the second motor may be at least partially positioned in the housing and operably associated with each other. It should be further appreciated that the sump pumping device may also include a first stator operably associated with the first motor. It should be further appreciated that the sump pumping device may also include a second stator operably associated with the second motor. It should be further appreciated that the first stator may operate at a high voltage and that the second stator may operate at a low voltage. It should be further appreciated that the sump pumping device may also include a first rotor and that the first rotor is operably associated with the first motor. It should be further appreciated that the sump pumping device may also include a second rotor that is operably associated with the second motor. It should be further appreciated that the sump pumping device may also include a first impeller operably associated with the first pump and a second impeller operably associated with the pump. It should be further appreciated that the first rotor and the second rotor may be juxtaposed and operably associated with the respective one of the first impeller and the second impeller.

According to yet another aspect of the present invention, a pumping device for pumping a fluid is shown. The pumping device includes a pump adapted for pumping the fluid and a first motor operably connected to the pump and adapted to provide energy to the pump. The pumping device also includes a second motor operably connected to the pump and adapted to provide energy to the pump.

According to yet another aspect of the present invention, a propulsion system for a pump for removing fluid collected from the subterranean surface adjacent a building. The system includes a housing operably connectable to the pump and a first motor operably connected to the pump and adapted to provide energy to the pump. At least a portion of the first motor is positioned within the power housing. The system also includes a second motor operably connected to the pump and adapted to provide energy to the pump. At least a portion of the second motor is positioned within the power housing According to another aspect of the present invention, a system for removing fluid from subterranean surface of a building is provided. The system includes a pump adapted for pumping the fluid and a first motor operably connected to the pump and adapted to provide energy to the pump. The system also includes a second motor operably connected to the pump and adapted to provide energy to the pump.

According to another aspect of the present invention, a pumping device for pumping a fluid is provided. The device includes a pump adapted for pumping the fluid and a motor. The motor has a stator and a rotor rotatably connected to the stator. The rotor and the stator are adapted to generate flux generally in a direction parallel to a rotational axis of the motor. The motor is operably connected to the pump and is adapted to provide rotational mechanical energy to the pump.

According to another aspect of the present invention, a pumping device for pumping a fluid is provided. The device includes a pump adapted for pumping the fluid and an electronically commutated motor operably connected to the pump and adapted to provide energy to the pump. The device also includes a controller operably connected to the motor and adapted to provide signals to the motor.

According to another aspect of the present invention, a motor for use with a pump for removing fluid collected from the subterranean surface adjacent a building is provided. The motor includes a housing configured for connection to the pump. The motor also include a stator connected to the housing and a rotor rotatably connected to the stator and operably connected to the pump. The motor is adapted to provide energy to the pump. The stator has electromagnetic coils. The motor also includes a controller operably connected to the motor and adapted to provide signals to the motor to provide electronic commutation to the electromagnetic coils.

According to another aspect of the present invention, a method for removing fluid from subterranean surface of a building is provided. The method includes the steps of providing a sump, providing a discharging conduit, providing a housing, providing a pump, providing a first motor, and providing a second motor. The method also includes the step of positioning the pump. The method also includes the step of positioning the first motor and the second motor at least partially in the housing. The method also includes the step of positioning the housing at least partially in the sump and the step of connecting the pump to the discharging conduit. The method also includes the step of operably connecting the pump to the first motor and the step of operably connecting the pump to the second motor.

According to another aspect of the present invention, a pumping device for pumping a fluid is provided. The pumping device includes a pump adapted for pumping the fluid and a power housing connected to the pump. The pumping device further includes a first motor operably connected to the pump and adapted to provide energy to the pump. At least a portion of the first motor is positioned within the power housing. The pumping device further includes a second motor operably connected to the pump and adapted to provide energy to the pump. At least a portion of the second motor is positioned within the power housing. The first motor has a first motor shaft and the second motor has a second motor shaft. The first motor shaft and the second motor shaft may be collinear. The first motor shaft may be connected or may be integral with the second motor shaft.

According to another aspect of the present invention, a pumping device for pumping a fluid is provided. The pumping device includes a pump adapted for pumping the fluid and a power housing connected to the pump. The pumping device further includes a first motor operably connected to the pump and adapted to provide energy to the pump. The pumping device may include a controller. The controller may include memory for storing operating conditions for the motor. The operating conditions may include normal operating conditions or conditions at failure. The memory may include memory that is capable of storing data after failure and/without external power to the memory. The memory may include periodic data and may include all or part of the measured date. The memory may include the latest data including the data at failure.

According to another aspect of the present invention, a pumping device for pumping a fluid is provided. The pumping device includes a pump adapted for pumping the fluid and a power housing connected to the pump. The pumping device further includes a first motor operably connected to the pump and adapted to provide energy to the pump. The pumping device may include a sensor. The sensor may be used to determine if the fluid that the pump is pumping contains chemicals that the sensor may sense or has a PH that the sensor may sense. For example the sensor may sense that the fluid contains sewage or harmful chemicals that may pose a problem for the property where the pump is installed. The sensor may send a signal to the property owner indicating that sewage or harmful chemicals have been found in the fluid.

According to another aspect of the present invention, a pumping device for pumping a fluid is provided. The pumping device includes a pump adapted for pumping the fluid and a power housing connected to the pump. The pumping device further includes a first motor operably connected to the pump and adapted to provide energy to the pump. The pumping device may further include a monitor to monitor incoming flow into the pumping device to match outgoing flow from the pump with incoming flow to improve efficiency of the system. Such matching of outgoing flow to incoming flow will provide for maximum battery life and for improved motor life by limiting frequent repeated motor starts.

According to yet another aspect of the present invention, the pumping device may further include piping designed to optimize fluid flow and system efficiency or instructions for providing piping designed to optimize fluid flow and system efficiency.

According to another aspect of the present invention, a sump pump for pumping a fluid is provided. The sump pump includes a pump adapted for pumping the fluid and a power housing connected to the pump. The pumping device further includes a first motor operably connected to the pump and adapted to provide energy to the pump. The pumping device may further include a sensor positioned in the power housing and adapted to detect water within the power housing. This could effectively detect the presence of moisture before the sump pump actually failed from this defect.

According to another aspect of the present invention the sump pump further includes a controller having software to detect moisture within the power housing.

According to another aspect of the present invention the sump pump further includes an oil reservoir and a sensor positioned in the oil reservoir adapted to detect moisture within the oil reservoir and to provide a signal indicating the presence of the moisture.

According to another aspect of the present invention the sump pump further includes a sensor to detect changes in chemistry within the sump pump caused by the presence of moisture within the sump pump. This could effectively detect the presence of moisture before the sump pump actually failed from this defect.

The methods, systems, and apparatus described herein facilitate efficient and economical assembly of an electric motor. Exemplary embodiments of methods, systems, and apparatus are described and/or illustrated herein in detail. The methods, systems, and apparatus are not limited to the specific embodiments described herein, but rather, components of each apparatus and system, as well as steps of each method, may be utilized independently and separately from other components and steps described herein. Each component, and each method step, can also be used in combination with other components and/or method steps.

When introducing elements/components/etc. of the methods and apparatus described and/or illustrated herein, the articles "a", "an", "the", and "the" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Described herein are exemplary methods, systems and apparatus utilizing lower cost materials in a permanent magnet motor that reduces or eliminates the efficiency loss caused by the lower cost material. Furthermore, the exemplary methods system and apparatus achieve increased efficiency while reducing or eliminating an increase of the length of the motor. The methods, system and apparatus described herein may be used in any suitable application. However, they are particularly suited for HVAC and pump applications.

Exemplary embodiments of the fluid flow device and system are described above in detail. The electric motor and its components are not limited to the specific embodiments described herein, but rather, components of the systems may be utilized independently and separately from other components described herein. For example, the components may also be used in combination with other motor systems, methods, and apparatuses, and are not limited to practice with only the systems and apparatus as described herein. Rather, the exemplary embodiments can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for removing fluid from a subterranean surface of a building, comprising:
    providing a sump;
    providing a discharging conduit;
    providing a motor housing including a cylindrical shell and opposed end caps;
    providing a pump;
    providing a shaft;
    providing an axial flux motor having an axial flux stator and an axial flux rotor;
    connecting the shaft directly to the axial flux rotor;
    connecting the axial flux stator to one of the opposed end caps of the motor housing;
    providing a radial flux motor having a radial flux stator and a radial flux rotor, the radial flux rotor spaced from the axial flux rotor;
    connecting the shaft directly to the radial flux rotor;
    connecting the radial flux stator directly to the shell;
    positioning the axial flux motor and the radial flux motor within the motor housing;
    connecting the pump to the discharging conduit; and
    connecting the pump to the shaft and to the sump; and
    connecting the axial flux rotor and the radial flux rotor solely to each other by the shaft.

2. The method according to claim 1, wherein the steps of providing the axial flux motor and of providing the radial flux motor comprise providing the axial flux motor and the radial flux motor adapted to be operably connectable to one of water pressure, a water reservoir, batteries of various voltage, AC solar power, DC solar power, DC wind turbine power, and AC wind turbine power.

3. The method according to claim 1, wherein the steps of providing the axial flux motor and of providing the radial flux motor comprise providing at least one of the axial flux motor and the radial flux motor adapted to operate at variable speeds.

4. The method according to claim 1, wherein the steps of providing the axial flux motor and of providing the radial flux motor comprise providing at least one of the axial flux motor and the radial flux motor with variable speeds adapted to match the incoming flow rate of the water in the sump and adapted to be changed to prevent water hammering.

5. The method according to claim 1, wherein the steps of providing the axial flux motor and of providing the radial flux motor comprise providing at least one of the axial flux motor and the radial flux motor adapted to operate in a reverse direction to attempt to clear debris from one of an intake and an impeller.

6. A propulsion system for a pump for removing fluid collected from a subterranean surface adjacent a building, the system comprising:
    a housing including a cylindrical shell and opposed end caps;
    an axial flux motor having an axial flux stator, an axial flux rotor, and a shaft connected to the axial flux rotor, the cylindrical shell of said housing surrounding said axial flux motor, the axial flux rotor mounted on the shaft and rotatably supported by the housing, the axial flux stator connected to one the opposed end caps, the axial flux stator and the axial flux rotor positioned within the cylindrical shell of said housing; and
    a radial flux motor having a radial flux stator and a radial flux rotor, the shaft connected to the radial flux rotor, the radial flux stator and the radial flux rotor positioned within the cylindrical shell of said housing, the radial flux stator directly connected to the shell, the axial flux rotor and the radial flux rotor spaced from each other and solely connected to each other by the shaft, the shaft connecting the axial flux rotor and the radial flux rotor to the pump.

7. The propulsion system according to claim 6, wherein at least one of said axial flux motor and said radial flux motor is adapted to be operably connectable to one of AC power, DC power, water pressure, a water reservoir, batteries of various voltage, AC solar power, DC solar power, DC wind turbine power, and AC wind turbine power.

8. The propulsion system according to claim 6, wherein at least one of said axial flux motor and said radial flux motor is a brushless alternating current electronically commutated motor.

9. The propulsion system according to claim 6, wherein at least one of said axial flux motor and said radial flux motor is adapted to operate at variable speeds.

10. The propulsion system according to claim 6, wherein at least one of said axial flux motor and said radial flux motor has variable speeds adapted to match the incoming flow rate of the water in the subterranean surface adjacent the building and adapted to be changed to prevent water hammering.

11. The propulsion system according to claim 6, wherein at least one of said axial flux motor and said radial flux motor is adapted to operate in a reverse direction to attempt to clear debris from one of an intake and an impeller.

12. The propulsion system according to claim 6: further comprising a battery; further comprising a control.

13. The propulsion system according to claim 6:
    further comprising a turbine; and
    wherein the turbine is adapted to be positioned in one of a downspout, a pressurized water line, and a conduit connected to a water reservoir, said turbine adapted to provide power to at least one of said axial flux motor and said radial flux motor.

14. The propulsion system according to claim 6, further comprising a controller, said controller adapted to establish a signature or characteristics of the operating parameters of said system at initial startup and to compare actual operating parameters with the signature at initial startup.

15. A propulsion system for a pump for removing fluid collected from the subterranean surface adjacent a building, the system comprising:
    a housing including a central portion and opposed end portions;
    an axial flux motor having an axial flux stator, an axial flux rotor, and a shaft connected to the axial flux rotor, the central portion of said housing surrounding said axial flux motor, the axial flux rotor mounted on the shaft and rotatably supported by the housing, the axial flux stator connected to one the opposed end portions, the axial flux stator and the axial flux rotor positioned within the central portion of said housing; and
    a radial flux motor having a radial flux stator and a radial flux rotor, the shaft connected to the radial flux rotor, the radial flux stator and the radial flux rotor positioned within the central portion of said housing, the radial flux stator directly connected to the central portion of said housing, the axial flux rotor and the radial flux rotor spaced from each other and solely connected to each other by the shaft, the shaft connecting the axial flux rotor and the radial flux rotor to the pump.

16. The propulsion system according to claim 15, further comprising a controller, said controller is adapted to monitor power used to calculate outgoing fluid flow rate and compare that flow to incoming fluid flow rate to measure the proper operation of the overall system including at least one of check valves, pipe connections and pipe and other blockages.

17. The propulsion system according to claim 15:
wherein said pump includes an impeller;
wherein said radial flux motor, said axial flux motor and said impeller are adapted to rotate in a first direction;
wherein said impeller is so secured to said shaft such that it will not release from said shaft if turned in a direction opposed to the first direction.

18. The propulsion system according to claim 15:
further comprising a controller;
wherein at least one of said radial flux motor and said axial flux motor comprises windings;
further comprising a temperature sensor positioned adjacent one of the windings and said controller, said controller and said sensor adapted to monitor the temperature of one of the windings and said controller to maximize system performance.

19. The propulsion system according to claim 15:
wherein at least one of said axial flux motor and said radial flux motor is an ECM motor;
further comprising a controller;
wherein said ECM motor is a backup motor; and
wherein said ECM motor is periodically operated and said controller is configured to perform diagnostics on said system.

* * * * *